(12) United States Patent (10) Patent No.: US 9,283,476 B2
Mityagin et al. (45) Date of Patent: Mar. 15, 2016

(54) INFORMATION COLLECTION DURING GAME PLAY

(75) Inventors: Anton Mityagin, Woodinville, WA (US); Aparna Lakshmiratan, Kirkland, WA (US); Asela J. Gunawardana, Seattle, WA (US); Christopher A. Meek, Kirkland, WA (US); David M. Chickering, Bellevue, WA (US); Paul N. Bennett, Kirkland, WA (US); Timothy S. Paek, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1952 days.

(21) Appl. No.: 11/843,468

(22) Filed: Aug. 22, 2007

(65) Prior Publication Data

US 2009/0054123 A1 Feb. 26, 2009

(51) Int. Cl.
 *G06F 17/00* (2006.01)
 *A63F 13/30* (2014.01)
 *G06Q 10/10* (2012.01)
 *G06Q 30/02* (2012.01)

(52) U.S. Cl.
 CPC .............. *A63F 13/12* (2013.01); *G06Q 10/10* (2013.01); *G06Q 30/02* (2013.01); *A63F 2300/558* (2013.01); *A63F 2300/5586* (2013.01)

(58) Field of Classification Search
 CPC .......... A63F 1/00; G06F 17/60; G07F 7/1008
 See application file for complete search history.

(56) References Cited

U.S. PATENT DOCUMENTS

| 7,849,043 | B2* | 12/2010 | Woolf et al. | 706/48 |
|---|---|---|---|---|
| 7,945,952 | B1* | 5/2011 | Behforooz | 726/22 |
| 2003/0064807 | A1* | 4/2003 | Walker et al. | 463/42 |
| 2003/0173743 | A1* | 9/2003 | Brink et al. | 273/297 |
| 2004/0121835 | A1* | 6/2004 | Willis et al. | 463/20 |
| 2004/0259641 | A1* | 12/2004 | Ho | 463/42 |
| 2005/0125302 | A1* | 6/2005 | Brown et al. | 705/26 |
| 2005/0209002 | A1* | 9/2005 | Blythe et al. | 463/42 |
| 2005/0240476 | A1* | 10/2005 | Bigott | 705/14 |
| 2005/0277472 | A1* | 12/2005 | Gillan et al. | 463/42 |
| 2006/0179053 | A1* | 8/2006 | von Ahn Arellano et al. | 707/6 |
| 2006/0282304 | A1* | 12/2006 | Bedard et al. | 705/10 |
| 2006/0287106 | A1* | 12/2006 | Jensen | 463/42 |
| 2007/0015584 | A1* | 1/2007 | Frenkel | 463/42 |
| 2007/0255702 | A1* | 11/2007 | Orme | 707/5 |
| 2007/0293322 | A1* | 12/2007 | Horowitz et al. | 463/42 |
| 2008/0102916 | A1* | 5/2008 | Kovacs et al. | 463/16 |
| 2008/0153596 | A1* | 6/2008 | Nguyen | 463/42 |
| 2008/0155399 | A1* | 6/2008 | Kock | 715/259 |

(Continued)

*Primary Examiner* — Paul A D'Agostino
(74) *Attorney, Agent, or Firm* — Steve Wight; Sandy Swain; Micky Minhas

(57) ABSTRACT

Systems and methods allow an on-line game to extract information relevant to a specific need of a game platform or service platform. The specific need relates to management and use of digital content, and is addressed by designing and playing an on-line collaborative game. The rules of the game intend to solve a specific task dictated by the specific need. Players' responses to the game generate a wealth of information related to a specific task objective, such as ranking, sorting, and evaluating a set of digital content items. To compel participation in a game, players can be rewarded with monetary value rewards. As a game illustration, an image selection game (ISG) that exploits human contextual inference is described in detail. The information extracted from ISG is a list of key-image associations, relevant for the task of image sorting and ranking.

20 Claims, 18 Drawing Sheets

(56) References Cited

U.S. PATENT DOCUMENTS

2008/0222295 A1* 9/2008 Robinson et al. ............. 709/227
2008/0256015 A1* 10/2008 Woolf et al. .................... 706/48
2008/0318678 A1* 12/2008 Stivoric et al. .................. 463/36
2009/0070852 A1* 3/2009 Chijiiwa et al. .................. 726/1
2009/0313301 A9* 12/2009 Reed et al. .................. 707/104.1
2010/0203953 A1* 8/2010 Alderucci et al. .............. 463/25

* cited by examiner

INFORMATION COLLECTION DURING GAME PLAY

TECHNICAL FIELD

The claimed subject matter is related to systems and methods to collect specific, useful information through collaborative computer games that exploit human contextual inference and reward game participants.

BACKGROUND

A typical game involves a player or team of players and a set of rules. Depending on the rules, games can be divided in two broad categories: (i) Competitive, and (ii) collaborative. In the first class the rules are designed to challenge player abilities and discriminate a winner. In the second class, rules are designed to leverage players' knowledge and promote collaboration throughout a game with no exclusive winner, or winning not being the goal of the game altogether. Instead, the main goal of the collaborative game participants is accomplishing a specific task defined by the game rules. By providing entertainment and personal fulfillment, both competitive and collaborative games are compelling propositions to human beings. To the accomplishment of completing the goals of a game, humans employ any number of their intellectual and/or physical abilities. Even when simple, mundane tasks are turned into games, humans tend to engage more enthusiastically in such tasks.

While on-line digital content continues to grow, and computers or artificial intelligence agents fail to emulate high-level human intellect necessary for the successful management of such content, the human affinity for games has only incipiently been exploited to harness the advantages of human input on management of digital content. Information extracted from such human intervention is currently limited, and much of the existing digital data continues to suffer from systematic misuse and mismanagement.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

System(s) and method(s) as described herein allow an on-line collaborative game to extract information relevant to a specific need of a game platform or service platform. The specific need relates to management and use of digital content, and is addressed by designing an on-line game that aims at executing a task of interest by motivating players to participate in the game. Additionally, successful completion of the task requires high-level intellectual human skills such as contextual inference, which computerized or artificial intelligence agents fail to emulate. The premise or rules of the game intend to solve a specific task dictated by a specific need. Players' responses to the game generate a wealth of information related the specific task. Such information is stored by a game platform. Exemplary tasks comprise image association with a query, and image labeling, ranking and sorting; universal resource locator (URL) ranking for web-based searches, and assessment of relevance of search results and snippet content; labeling of video and sound documents for utilization in web-based searches; evaluation of webpages as web spam and email messages as email spam; blog assessment of reputation and relevance, and analysis blog tone; translation of documents; and transcription of handwritten fragments and telephonic recordings.

To compel players to participate in the game, and thus generate information relevant to a task, players receive rewards of monetary value. Players can claim rewards based on the scores attained while playing a game. The scores thus have monetary value and fraud mitigation is necessary in order to prevent fraudulent accumulation of points with the intent to illegitimately claim rewards. Fraud mitigation strategies are largely based on (i) dissuading communication among players, and (ii) control round of playing handed to selected players to probe whether the player is a computer script seeking indiscriminate accumulation of points.

Besides the direct benefit from an in-house game solution deployment, game platforms can offer game solutions to third-party service platforms with specific needs related to digital content. In such scenario, a specific task is identified and a custom-designed game is deployed for a third-party service platform. The extracted information relevant to the task is then sold to the third-party service provider.

As an illustration of the systems and methods presented in this application, an image selection game (ISG) that aims at generating associations between queries and images, to improve image searches, is described in detail. The information extracted from ISG is a list of key-image associations, relevant for the task of image sorting and ranking.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and novel features of the claimed subject matter will become apparent from the following detailed description of the claimed subject matter when considered in conjunction with the drawings.

DETAILED DESCRIPTION

Figure 1:
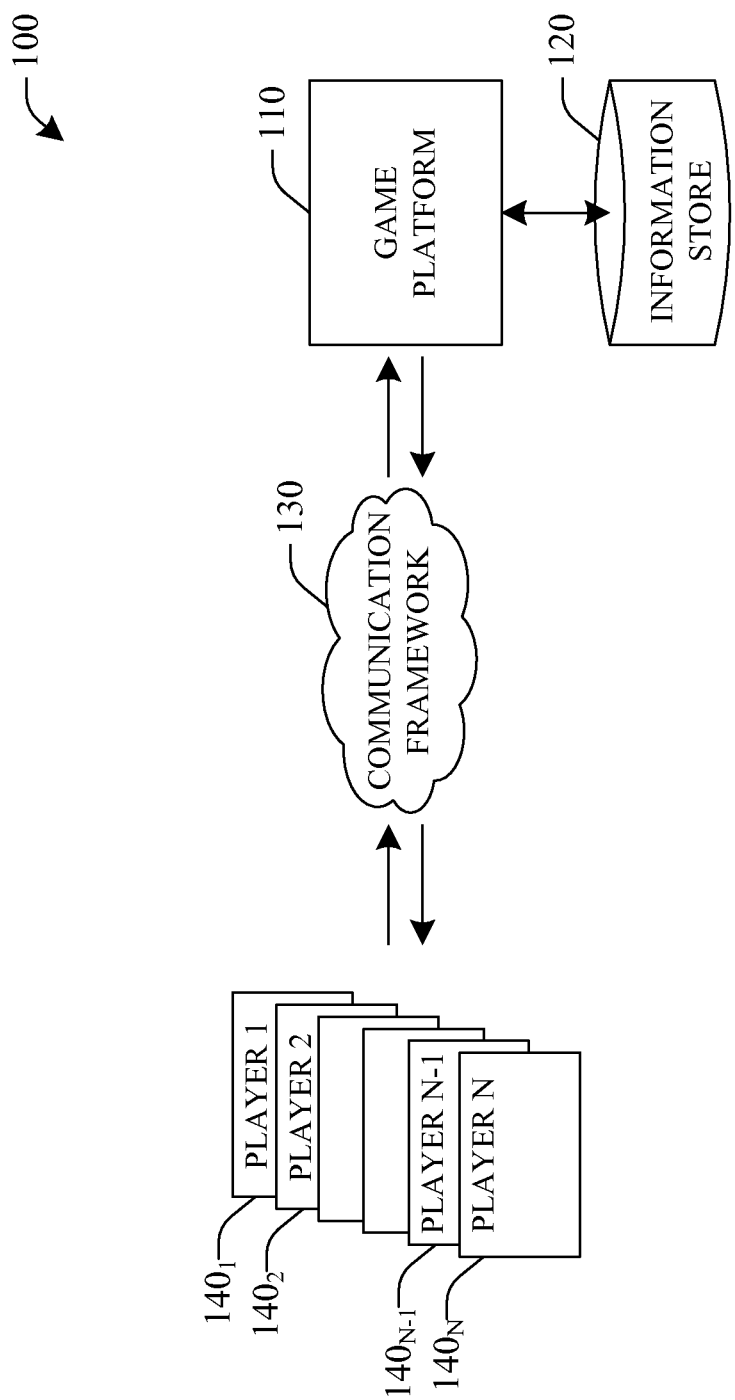
FIG. 1 is a high level illustration of a system in which a game platform gathers information as a result of a set of players participating in a game played over a network.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Further, the terms "component," "system," "module," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

In this application the term "player" or "agent" generally refer to a human entity (e.g., a single person or group of people) with access to computer-related communication infrastructure, and computer-related systems.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

Systems and methods that allow extraction of information related to a specific task through playing an on-line collaborative game are described below. The task can relate to management of digital information, and the game can be designed to address specific aspects of such task. Player engagement is motivated through monetary rewards as described herein. A specific image selection game is also described in detail.

Figure 17:
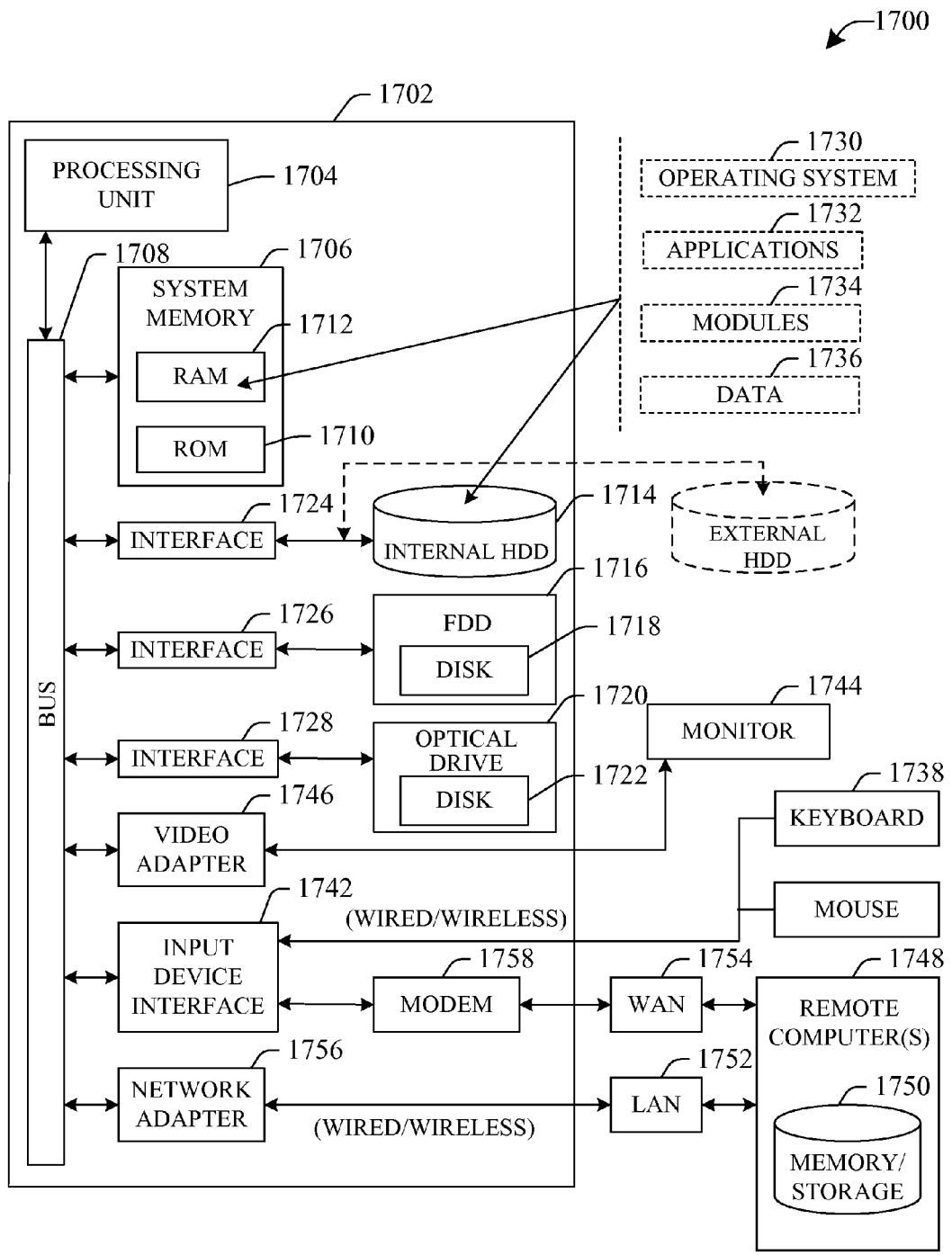

FIG. 1 illustrates a system 100 in which a game platform 110 can collect useful information as a result of a set of players $140_1$-$140_N$ (N>1) playing a cooperative game over a network (e.g., an on-line game). The communication framework 130 that allows communication between the game platform and the set of players $140_1$-$140_N$ is described in detail below (FIG. 17). Game platform 110 can facilitate access to various games. The nature of such games can be determined by specific needs of the game platform. In an aspect, such needs can be dictated by highly complex problems that cannot be reliably solved by computer algorithms because inherently human input and abilities, such as high-level of abstraction, utilization of context, and subjective non-analytic judgment, are needed to achieve a satisfactory solution. It should be appreciated, however, that other complex problems or difficulties can be cast into games. Examples of difficulties that can be addressed by harnessing the human resources of players (e.g., $140_1$-$140_N$) playing cooperatively a desired game are described below. One goal of a cooperative game facilitated by the game platform can be to extract knowledge from a community, represented in system 100 by the set of players $140_1$-$140_N$, players that while playing the cooperative game are effectively conducting "work" for the game platform 120. In one aspect, the use of a community can naturally exploit its diversity. Such diversity can be reflected in the myriad of backgrounds (e.g., educational, cultural, socioeconomic, religious) that the players (e.g., $140_1$-$140_N$) bring in while playing the game.

The "work product" of the players can be the information gathered by the game platform during games. The game platform can store in information store 120 all or substantially all the useful information derived from playing a specific cooperative game associated with a specific problem. Two valuable features of such information can be the following: (i) Operational and commercial value, and (ii) developmental. Value (i) can arise from the fact that the collected information represents part or all the solution to a need of the game platform 110. Such need can relate to business operations (e.g., e-commerce, on-line searching). In particular, the game platform can be interested in reducing operational costs originated from the lack of a satisfactory or reliable solution to the difficulty the game seeks to address. In one aspect, operational costs can represent wages and other fixed costs of retaining employees pursuing the difficulty addressed by the game. It should be appreciated that a successful implementation of collaborative game can receive contributions from massively large numbers (N>>1) of players (e.g., players $140_1$-$140_N$), with the ensuing increase in manpower devoted to solve the game platform's difficulty. In addition, the game platform can share the information in information store 120 with affiliates, or can sell the information, or trade it with competitors in exchange for other intelligence (e.g., player or user intelligence) that can be needed by the game platform. (Advantageous usage of the collected information is described in greater detail below.)

Regarding (ii), the developmental value originates from using the information to develop or refine, or a combination thereof, designs of computer algorithms aimed at solving difficulties that prompted the game facilitated by the game platform. In an aspect, the gathered information can be used to develop test data for (supervised) training and learning of artificial intelligence agents that the game platform can subsequently use in solving the problem that originated the collaborative game. In machine learning and data mining, massive volumes of test data are necessary for (1) testing and validation of algorithms aimed at reproducing human judgment, and (2) learning new matching functions.

Figure 2:
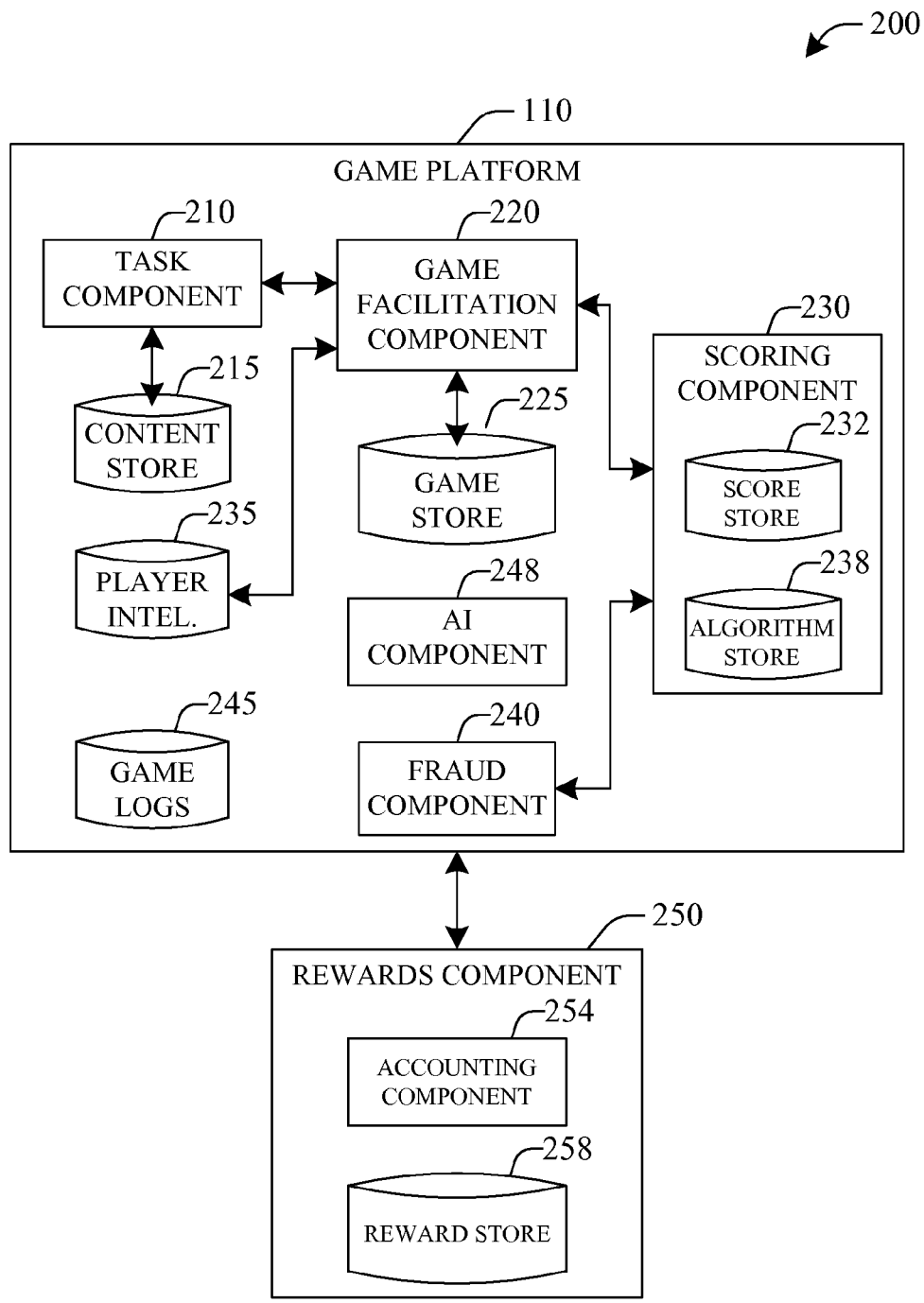
FIG. 2 is a granular block diagram of a game platform.

Next, details of a game platform 110 are described. FIG. 2 is a granular block diagram of an embodiment 200 of game platform 110. In this embodiment, there are four components: (a) Task component 210, (b) game facilitation component 220, (c) scoring component 230, and (d) fraud component 240. While in this embodiment such components are illustrated separately, it should be appreciated that in other embodiments of the game platform, two or more components can be consolidated in one component. Such other embodiments are also within the scope of the present application. In addition, the game platform contains six information/data containers: (i) content store 215, game store 225, score store 232, player intelligence 235, algorithm store 238, and games log 245. It should be appreciated that in this embodiment, the game platform can be coupled to a rewards component for rewarding participant players (e.g., $140_1$-$140_N$).

Task Component.—

Each game can be designed to address a specific difficulty, or task, of the game platform. Task component 210 defines a specific objective to be accomplished and specific information to be collected by playing a game; the information can be collected in information store 120 upon completion of the game objective or task. Exemplary specific objectives include, but are not limited to including, the following. Image association with a query or keyword, image labeling, and image ranking and sorting; universal resource locator (URL) ranking for searches, and assessment of relevance of search results and snippet content to summarize a search result; translation of documents in a first plurality of languages to a second plurality of languages; evaluation of on-line advertisement relevance; labeling video for video searches; identification of music fragments, e.g., music genre (termed herein as "sounds like" task) and labeling for search purposes; transcription, translation, or a combination thereof, of songs; translation of natural language documents such as snippets, webpage fragments; identification of spam webpages; identification of spam email messages; assessment of level of interest (termed herein as "hot or not" task) of images, documents, songs, videos, and webpages—it should be appreciated that the "hot or not" task can also be applied to reputation measures of authors, publishers, service providers, service brokers, retailers, etc.; assessment of relevance of search results; evaluation of quality and level of interest (e.g., "hot or not" task) of peer-to-peer questions and answers; blog assessment, e.g., "hot or not" task applied to blog reputation and relevance, and analysis such as tone analysis, etc.; transcription of telephone recordings or conversations; and transcription, recognition and shape labeling of handwritten contents. It should be appreciated that tasks such as "hot or not" help create a ranking of content items which benefits from the inclusion of context and player expertise. Such a task can be particularly useful in scientific or academic environments, where large volumes of state-of-the-art work are published daily. In one aspect, the game platform can solicit players with specific expertise to conduct a "hot or not" task on a set of research scientists, a set of recently published articles, or a set of candidates for a faculty position or for tenure within a university department. In the case of candidates for faculty or tenure, "hot or not" rankings can be used as a part of the hiring/promotion process. In another aspect, conducting a "hot or not" task can be employed to determine what content is "hot," or highly advantageous, to be placed online in a website to increase traffic.

In yet another aspect, a game's specific objective can be to reveal whether a web page has a specific property in addition, or alternative, to relevance in response to a query, as mentioned in the above example list of objectives. As an illustration, a website, e.g., theballgame.com, might be considered an authoritative and relevant response to the query "baseball scores;" but, conversely, it can be considered relevant yet not authoritative with respect to "baseball steroids." It is noted that other properties that can present interpretative multiplicity—e.g., various additional as well as alternative interpretations can be associated with the property—can include, but are not limited to including, location (e.g., directions to a store or landmark can be considered more or less authoritative depending on whether the user is located near the landmark or far from the landmark); reading level, for example, some query topics on a web page can be understood by a beginner reader such as an 8 year-old child, whereas a disparate query topic can be at a 15 year-old adolescent level; commerciality (e.g., a web page may sell books but contain reviews of several disparate items—thus it commercial with respect to "books" but not with respect to "lawn tools."

Task component 210 is coupled to content store 215, which provides content items or entities that determine the scope of a specific task that is to be addressed and specific information that is to be gathered by playing a suitable, specific collaborative game. Players use the content items to play such collaborative game. As an example, and not by way of limitation, the content store can contain images; email messages; blog fragments, query logs, universal resource locator listings; titles and fragments of movies, songs, and books, both in English and foreign languages; question listings; published and pre-print scientific articles; "fact books" and profiles (e.g., demographic, socioeconomic) of universities, colleges, high schools, both private and public; occupational data (such as compensation and perks, job market current and forecast conditions, professions in high demand, etc.); entertainment information (e.g., listings of restaurants, movie theaters, night clubs); health information; and documents in foreign languages. Typically, the materials in the content store 215 are those commonly found in the internet. It should be appreciated that proprietary information of institutions and organizations can also be present in an information store (e.g., content store 215). As an example, results of experiments conducted by a research-intensive, high-technology organization can be included in the content store 215; so can institutional data of not-for profit and government organizations, or the like.

Game Facilitation Component.—

Figure 3:
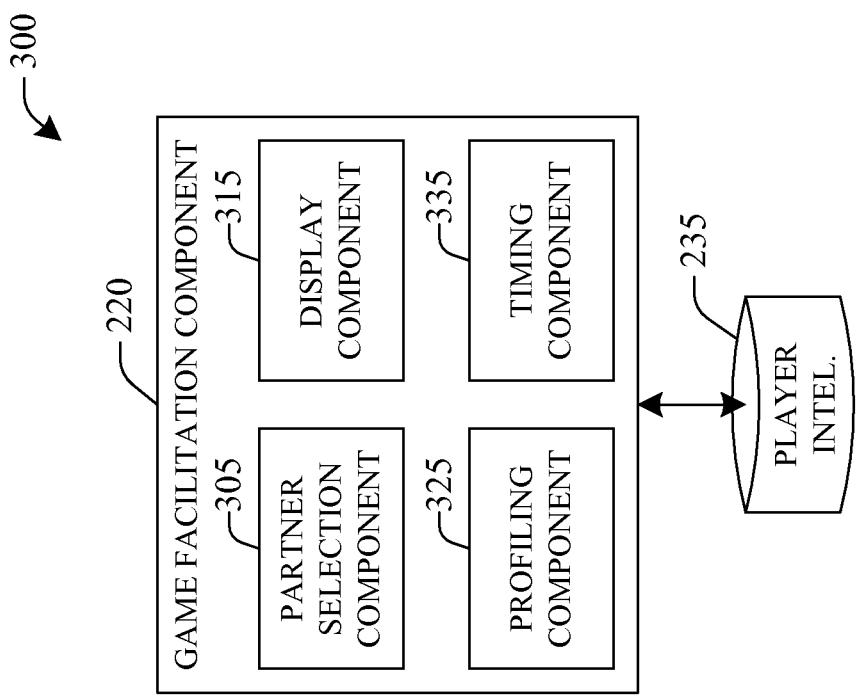
FIG. 3 is a granular block diagram of a game-facilitating component.

For a specific task, a game can be designed, developed, and stored in game store 225. The game facilitation component 220 facilitates playing the game. In doing so, the game facilitation component 220 can access game store 225 and task component 220 in order to provide players with the elements necessary to cooperatively play a specific game. Additionally, as the game facilitation component 220 interfaces with players, it has access to valuable player intelligence, which can be stored in the player intelligence component 235. Moreover, the game facilitation component can retain records of gaming sessions in game logs store 245. Such records can be important for an artificial intelligence component 248 or agent to find patterns in the human handling of the tasks. Those patterns can be employed for machine-based game playing. Below the game facilitation component is described in further detail (FIG. 3).

Artificial Intelligence Component.—

The term "intelligence" refers to the ability to reason or draw conclusions about, e.g., infer, the current or future state of a system based on existing information about the system. Artificial intelligence (AI) can be employed to identify a specific context or action, or generate a probability distribution of specific states of a system without human intervention. Artificial intelligence relies on applying advanced mathematical algorithms—e.g., decision trees, neural networks, regression analysis, cluster analysis, genetic algorithm, and reinforced learning—to a set of available data (information) on the system. In particular, the AI component 248 can employ one of numerous methodologies for learning from data and then drawing inferences from the models so constructed, e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein.

Scoring Component.—

Successful cooperation can be awarded score points, e.g., upon the completion of a task defined by task component 210. Scoring component 230 awards points and updates the score of participating players, retaining a record of scores in a score store 232. To award points, the scoring component can rely on one or more scoring algorithms stored in an algorithm store 238. Such algorithms can be simple, e.g., a predetermined number ($\Delta$) of points is awarded per successful round, or can depend on several factors such as (i) the specific game the game facilitation component 220 is facilitating; (ii) complexity level of the game being played—in a game where the content items are images, points awarded for successful interaction can be proportional to the number of images presented to the participating players (e.g., $140_1$-$140_N$), or points awarded in each interaction can be increased upon successive success such as in a sequence of matching selections; and (iii) number of participating players in a game. In the score store 232, all participant players have a record of scores attained in previous games and rounds in a game. In one aspect, such information can also be included in the player intelligence store 235. In addition to awarding points the scoring component 230 also deducts points. Point deduction can be warranted in several instances, such as when participant players do not match their selection in item selection games or when no-match is found in rankings put forward by participating players in ranking games. In addition, communication between players can cost a point deduction (see below).

Fraud Component.—

Fraudulent gaming aimed at indiscriminately increasing score points can take place through use of software scripts intended to automate a player's game (e.g., robots). Fraud component 240 can mitigate such automated fraud. In an aspect, fraud component 240 can select a player and employ "probing" items to detect robots. In one aspect, in query/image matching game, a mismatched pair of (query, image set) can be used to detect a robot. In such a mismatched case, a legitimate player will avoid making a selection but a robot will still make a selection. In another aspect, a large number (e.g., $10^5$-$10^6$) of images can be rendered and utilized to monitor response time of a selected player. A robot would respond quickly, whereas a legitimate player will note the large number of images and generally will not produce a timely response. In yet another aspect, in a game of identification of music fragments, the game platform can present a selected player with short fragments of white noise; a legitimate player will note the inadequacy of the fragment and refrain from responding, whereas a robot would still produce an answer.

Another source of scoring fraud can be communication among players, which can produce a large number of scoring points by generating agreement. Fraud component 240 can mitigate communication fraud by monitoring the time evolution of the scores of players that communicate. It should be appreciated, however, that a player's ability to probe another player with questions (e.g., "Do you think image P is inappropriate?" or "Does song fragment R sound like country music?") can help a labeling process or ranking process. Thus, to obtain the benefits of communication yet dissuade players from using communication to commit fraud, a premium can be added to player communication. Such premium can be covered with player's accrued points. The points cost can be calculated by using a penalization function. In one aspect, a penalization function can take the form $\Delta^n$, where $\Delta$ is a predetermined number of points and n (integer greater than unity) is a counter index that reflects the communication instance. $\Delta$ can equal the number of points awarded in a successful round of playing, but other choices are possible. It should be appreciated that such a penalization function heavily penalizes players that communicate often, effectively making any gain in points derived from successive communication not worthwhile: After a few communication instances, a player looses more points by communicating than points won as a result of such communication. As an example, consider a game that awards 20 points in a round and $\Delta=20$, if a player communicates once (n=1) with the other player the cost is $20^1=20$ points and communication results in a break-even point for the round. If the same player, communicates a second time (n=2) the cost is $20^2=400$ points, communication thus results in losing 380 points.

Yet another source of fraud encompasses effecting the actual information accumulated in information store 120, as a result of active gaming of players $140_1$-$140_N$, in anticipation of the a posteriori use of the information—e.g., manipulating the labels collected in anticipation of their use. As an example, if a game is used to determine relevance of web pages with respect to queries, an unscrupulous search engine optimization company might attempt to boost the relevance of their client web pages over a broad range of queries.

It is noted that other forms of fraud that can arise during the deployment lifetime of a game can be identified by game platform 110 and mitigated accordingly through fraud component 240.

Reward Component.—

In embodiment 200 (FIG. 2), game platform 110 is coupled to a rewards component 250. This component possesses two main elements: an accounting component 254 and a reward store 258. The accounting component 254 is responsible for verifying that points can be used, for example, by players to access merchandise related to a game, or other unrelated merchandise, and it also converts scores to currency points that can be used to claim rewards. Thus, it should be appreciated that the currency points, and indirectly the point score, have monetary value. In an aspect, the rate at which the conversion takes place is dictated by the manufacturer of the merchandise the player can claim using currency points. In another aspect, in an image ranking/sorting game, players can use points to access image galleries on different topics, trips to locations portrayed by images, objects portrayed by images, etc. In yet another aspect, a number of points above a threshold level can make a player eligible to enter a draw for a product identified in images (e.g., a Caribbean cruise or a trip around the world, if the ranked/sorted images related to tourism travel destination; custom-built cars; trips to fashion shows, if the images related to designer clothing.) The lottery draw can be regulated by the game platform 120. The merchandise that players can claim using currency points, or access through a lottery draw, is contained in a rewards store 258. In an aspect, the reward store 258 is maintained by the game platform 110, to directly compensate players for contributing to solve a task specific to the played cooperative game. It should be appreciated, however, that the rewards store 258 can be maintained by a third-party content or service provider. It should be further appreciated that in embodiment 200, the presence of a rewards store 258 with monetary value can significantly increase fraudulent attempts to interact with the game platform 110; game platform 110 can mitigate such attempts through fraud component 240.

FIG. 3 is a granular block diagram of an embodiment 300 of a game facilitation component. Game facilitation component 220 can select a game according to a specific task, execute the game, and impose the game rules. In an aspect, the rules of the game require grouping participant players into groups of two or more to play the game; such groups are formed by a partner selection component 305. Partner selection can be based at least in part on transcripts of previous games played, such transcripts being retained by the game platform 110 in the game logs store 245. Alternatively or additionally, partner selection can be based on player self-selected profiles. In an aspect, such profiles characterize players (e.g., $140_1$-$140_N$) and their expertise (e.g., advanced, expert knowledge or novice) in specific fields that can be related to the specific problem the game platform seeks to solve through the game. Profiling of players can also be accomplished via a profiling component 325. The profiling component 325 can build a profile for selected player(s) based at least in part on the player's behavior during game(s). Game facilitation component 220 retains the player's profile in a player intelligence store 235. Player intelligence can be used to identify "behavioral prototype players," by constructing and assessing similarity measures based at least in part on (i) how well players performed together in different cooperative games, (ii) what questions/items/situations led to outstanding/poor performance, or (iii) any combination thereof. AI component 248 can automatically construct such similarity measure, and can also apply clustering algorithms (e.g., k-means and k-medoids, fuzzy c-means, Gaussian means, hierarchical and density-based clustering) to identify players based on the values of similarity measures. It should be appreciated that the game platform can objectively evaluate performance through utilization of calibration or checkpoint questions, items, situations, or a combination thereof.

Alternatively, or in addition, to employing AI for profiling and clustering of players, game facilitation component 220 can adopt a nested associated game strategy, wherein a regulatory or advisory game is played within a first game, wherein the responses of the players (e.g., $140_1$-$140_N$) of the first game are evaluated. It should be appreciated that the advisory nature is with respect to game platform 110 for its benefit. As an example, in a first game where participants judge whether two queries are related, the game platform 110 can initiate a second, nested regulatory/advisory game in an on-demand fashion wherein players of the second game rate/evaluate the choices of players of the first game as to whether a web page is relevant to a query. In the second game, a user can type a query to rate relevant web pages, but rather than displaying that query (which can allow communication), game facilitation component 220 can dispatch the query to the first game to get online user feedback as to related queries and use those related queries in the second, advisory game. It should be appreciated that other purposes of nested associated games can be contemplated are within the scope of the subject disclosure.

Display component 315 interfaces game platform 110 and players $140_1$-$140_N$. The display component 315 renders contents of the game to players $140_1$-$140_N$, over communication framework 130, according to the task that is sought to be solved by playing a selected game. At the players end, the contents can be rendered in the display and sound unit(s) of desktop and laptop computers, handheld and portable devices (e.g., cell phones, flexible display devices), navigation and entertainment systems of automotive system, interactive desktop and portable television sets, etc. More importantly, display component 315 can render elements/items that are part of the game mechanics that allow the game to be played (e.g., presentation of text fragments, images, sound, video, and other content items). Such contents are not necessarily shown in the same order to players $140_1$-$140_N$ to avoid positional bias (e.g., in an image selection game, human players have a tendency to click images that are at or near the top of a display window) of a player when interacting with game platform 110. Additionally, the rendered contents can be selected via a profile-driven selection process to attain specific quality of player responses. In a profile-driven display content selection, content items can match a player profile, which can be stored in player intelligence store 235, in order to access "expert" judgment on the topic that characterizes the rendered contents, or content items can fail to match a profile, thus accessing "novice" judgment. Moreover, content selection for display can be decided on the basis of computing an item-item similarity, or correlation, metric such that the selected content item belongs to the same content domain. Furthermore, the game facilitation component 220 can selected content items for display based on the expected difficulty in generating a response from players $140_1$-$140_N$. In one aspect, the displayed information comprises task information and game rules. It should be appreciated that such information can compel a prospective player to play the game, or can discourage him/her. Player information can be displayed (e.g., name, nickname or login name to a computer the player uses to access the game platform 110, as well as information bites extracted from the player profile should the player choose to have such information displayed). Display of player information can add a social aspect to the game by (i) acting as an endorsement of the game to peers and friends of a player, and (ii) presenting information that can compel other players to engage in the game because those players feel identified with the profile of the player participating in the game. As discussed above, it should be appreciated that player information can compel players $140_1$-$140_N$ to legitimately communicate with other players $140_1$-$140_N$, but communication can also be employed for fraudulent purposes and, as discussed supra, the game platform can opt for penalizing player communication. Scoring information as well as timing information (see below) can be displayed by the display component 315.

In the game facilitation component 220, the timing component 335 can ensure that the game spans a time interval ($\Delta\tau$), e.g., 90 seconds, predetermined by the game platform 120. In an aspect, $\Delta\tau$ optimizes player's attention span in order to maintain a high-quality interaction with the game interface, with the ensuing player entertainment and high-quality information extracted by the game platform 110.

Additionally, completion of a game match between selected partners need not require a significant time commitment on the part of the players.

Figure 4:
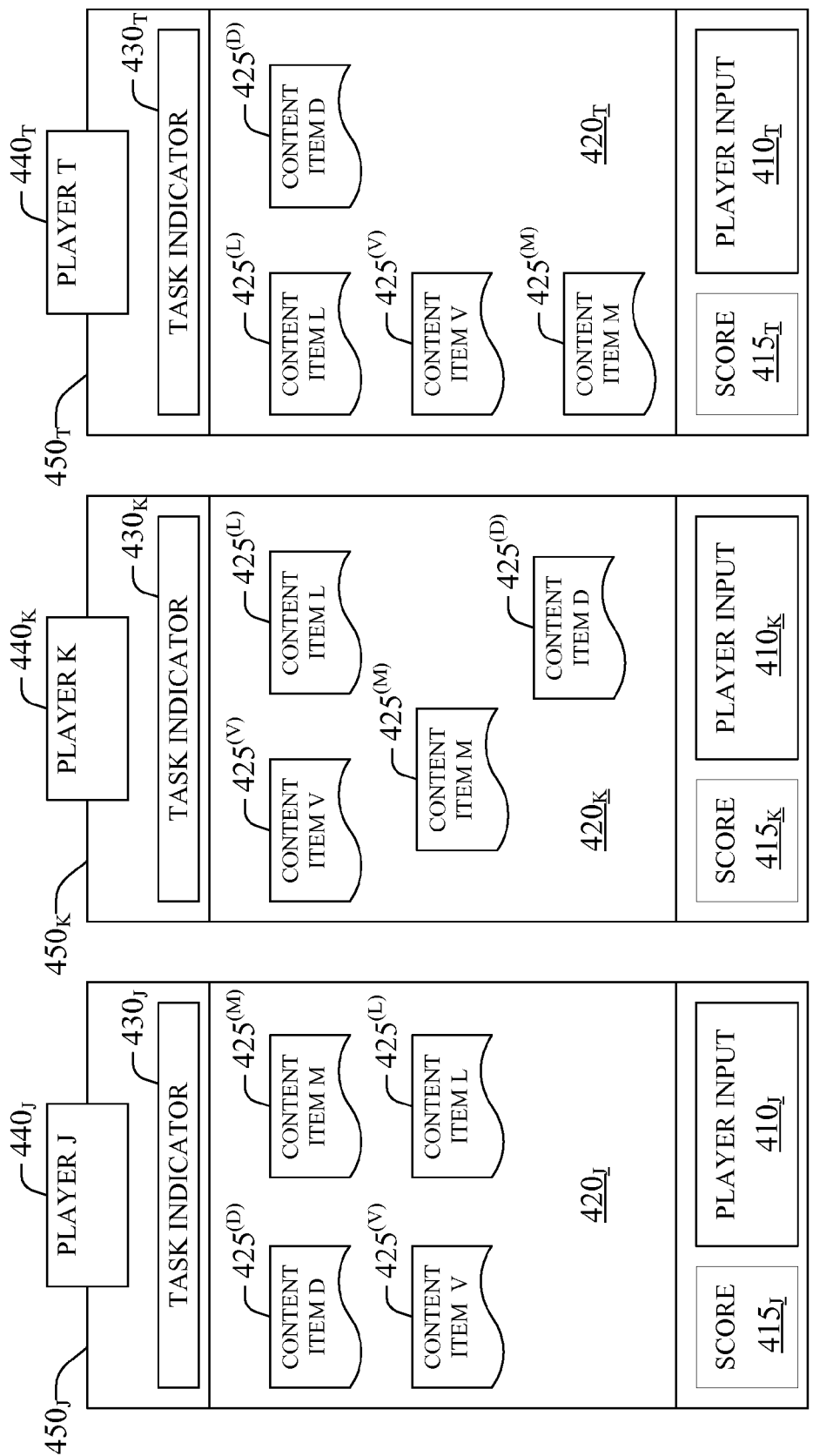
FIG. 4 is an illustration of exemplary display realizations for different players for a discrete-choice game.

FIG. 4 is an illustration of an exemplary display for a discrete-choice game as displayed to three players. Display realizations $450_J$, $450_K$, and $450_T$ present, respectively, content items $425^{(V)}$, $425^{(M)}$, $425^{(D)}$, and $425^{(L)}$, to players $440_J$, $440_K$, and $440_T$. These content items are displayed in display area 420. Each player has access to such a display area; namely, $420_J$, $420_K$, and $420_T$. Although in FIG. 4 each display area is illustrated as having the same size, it should be appreciated that each player can have access to different size of display area. Additionally, it should be appreciated that in case of content items with acoustic components (e.g., video or song fragments), the displayed characteristics of the items can be indicative of the acoustic nature of those items. Content items can be any of the items present in content store 215 (discussed supra), and selected as discussed above in connection with profile-driven selection, and similarity-driven selection. It should be noted that the same set of content items $425^{(V)}$, $425^{(M)}$, $425^{(D)}$, and $425^{(L)}$ is presented to each player, but in a different positional configuration in order to avoid positional bias (see above) on the interaction of the players $440_J$, $440_K$, and $440_T$ with a game platform (e.g., game platform 120). Additionally, the different configurations of the content items can allow different degrees of influence on the context-sensitive judgment on the interaction of players $440_J$, $440_K$, and $440_T$ with a game platform 110. Features such as font style, size and color, display area 420 background colors, and volume in case of a content item with acoustic components, can be modified among display realizations presented to different players in order to study the role of such parameters on context-sensitive judgments.

Other elements in the display realizations are: task indicator 430, player input area 410, and player score monitor 415. Task indicator 430 succinctly displays the premise of the game, which can be the same for each participating player, as expected from the collaborative nature of game. The following are exemplary game premises that can be displayed in a task indicator 430 for suitable games: "Sort images according to their relevance to query 'tiger';" "Translate handwritten text fragments;" "Identify music that sounds like: 'Country';" and "Rank images below according to their relevance to query 'cute dog'." To allow players to play, or actively participate in addressing the game premise, a player input area 410 is displayed. In this area, players can respond to the game premise, by entering their input (such as sorting, ranking, translating, identifying, etc.) Regarding score monitors (e.g., $415_J$, $415_K$, and $415_T$), in general, these monitors can display different values for different players even though the game proposition is collaborative and players (e.g., players $440_J$, $440_K$, and $440_T$) can accrue the same number of points upon successful interaction with the game platform 110. It should be appreciated that in asynchronous games, different players (e.g., players $440_J$, $440_K$, and $440_T$) can enter the game at different times, thus having fewer or more opportunities than other players to accrue score points. In cases in which games are synchronous, and players (e.g., $440_J$, $440_K$, and $440_T$) start playing simultaneously, different players can present the same number of score points due to the collaborative nature of games.

In the display realizations illustrated in FIG. 4, no elapsed time monitor is displayed. It should be appreciated, however, that games (residing, e.g., in game store 225) can have an allotted play time, as discussed above, and therefore in those cases an elapsed time or remaining time monitor will be displayed.

Figure 5:
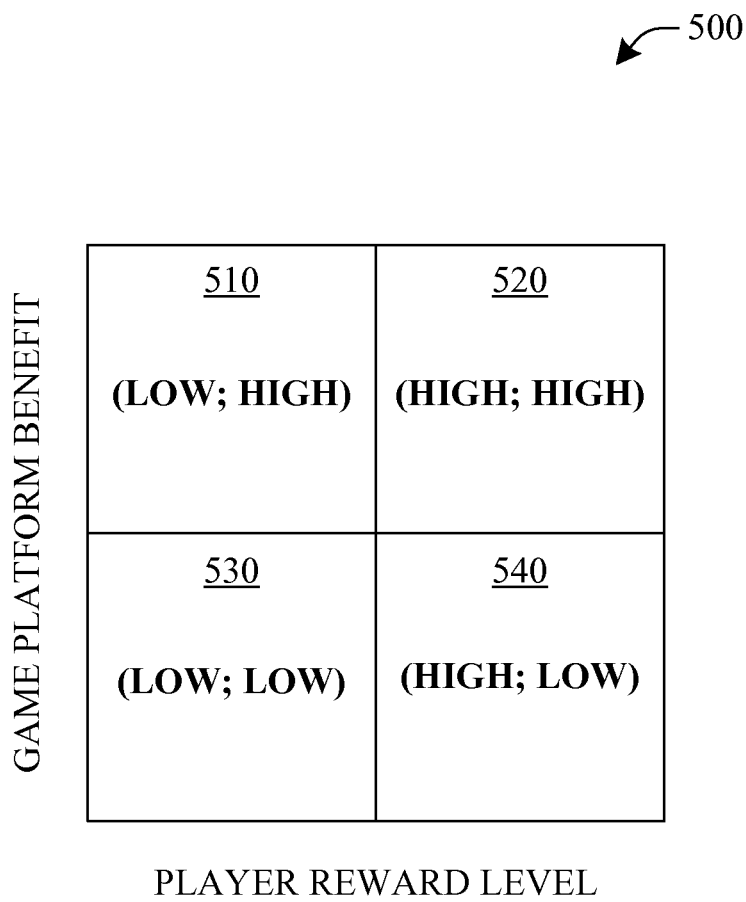
FIG. 5 is a benefit-reward quadrant diagram.

In addition to design principles and implementations discussed above, the utility of a game, and the benefit to a game platform 110, can be tied to players' level of reward obtained by playing the game. Such game-platform-player relationship can be summarized in a benefit-reward quadrant diagram 500, as illustrated in FIG. 5. Games as those discussed supra can be categorized by a 2-tuple: (reward; benefit), where benefit refers to the level of solutions to a specific task that can be attained with a related, specific game; rewards refers to the level of entertainment and monetary rewards that a player can receive during participation in a game. Quadrants 510 and 520 are (low; high) and (high; high) quadrants, respectively. Due to the high benefit to the game platform, these quadrants are "platform quadrants." On the other hand, quadrants 530 and 540 are (low; low) and (high; low) quadrants, respectively. Quadrants, 520 and 540 are player quadrants. Thus, game design can optimize the utility of a game by aiming at quadrant 520, which is the win-win quadrant for both game platform (e.g., game platform 110) and players (e.g., players $140_1$-$140_N$). In such a quadrant, a large number of players will likely participate, which can result in more robust solutions to the tasks associated with specific games that a game platform needs solved. It should be appreciated that there can be at least two categories of game solution deployment: (a) A service platform controls (e.g., by acquisition or development) the game platform and users of the service platform become players for its benefit. This alternative is herein termed as in-house deployment. (b) Outside-service deployment, where a game platform 110 offers game solutions to third-party service platforms as a service provision. Such deployments are discussed next.

Figure 6A:
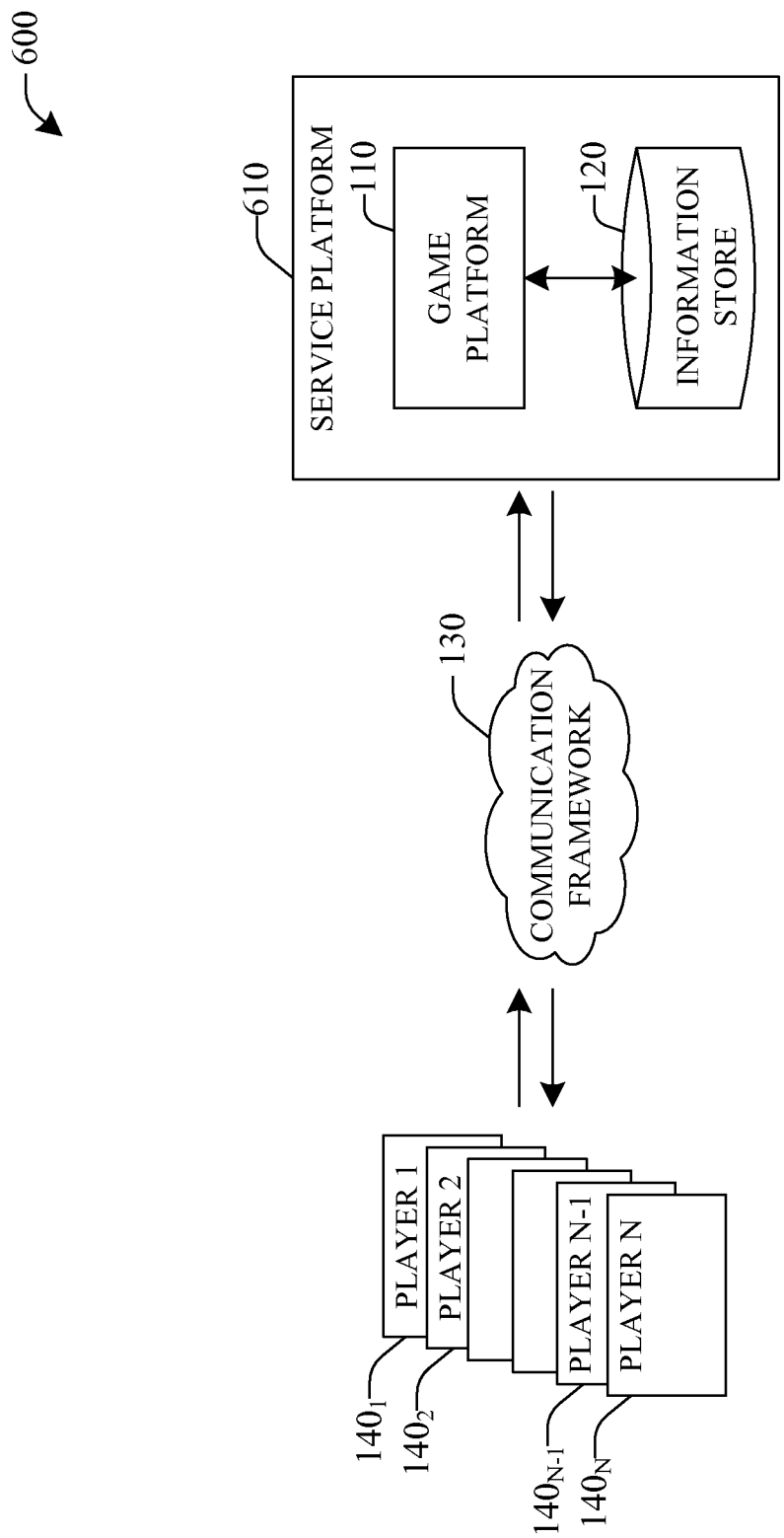
FIGS. 6A and 6B show game solution deployments.
Figure 6B:
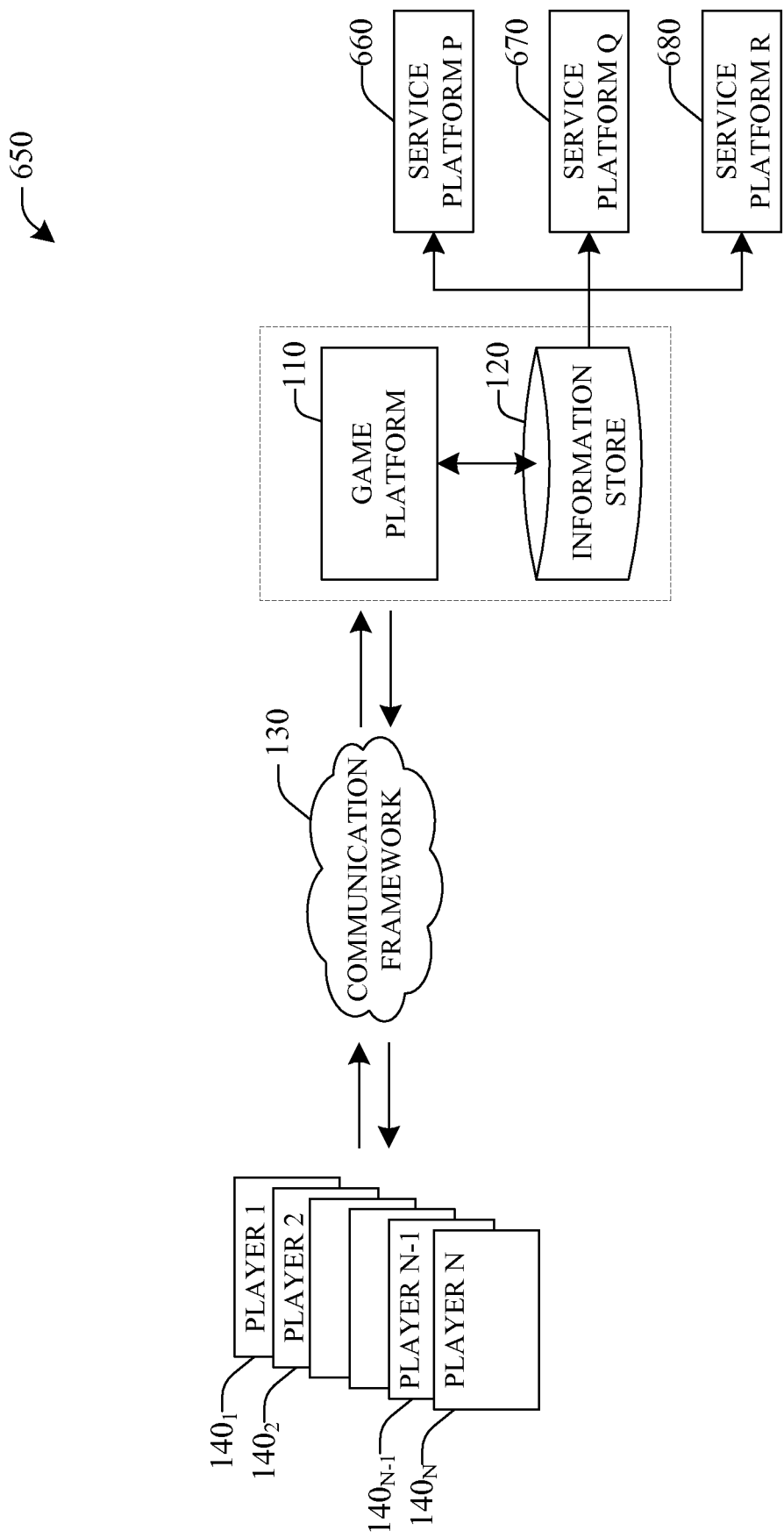
Figure 16:
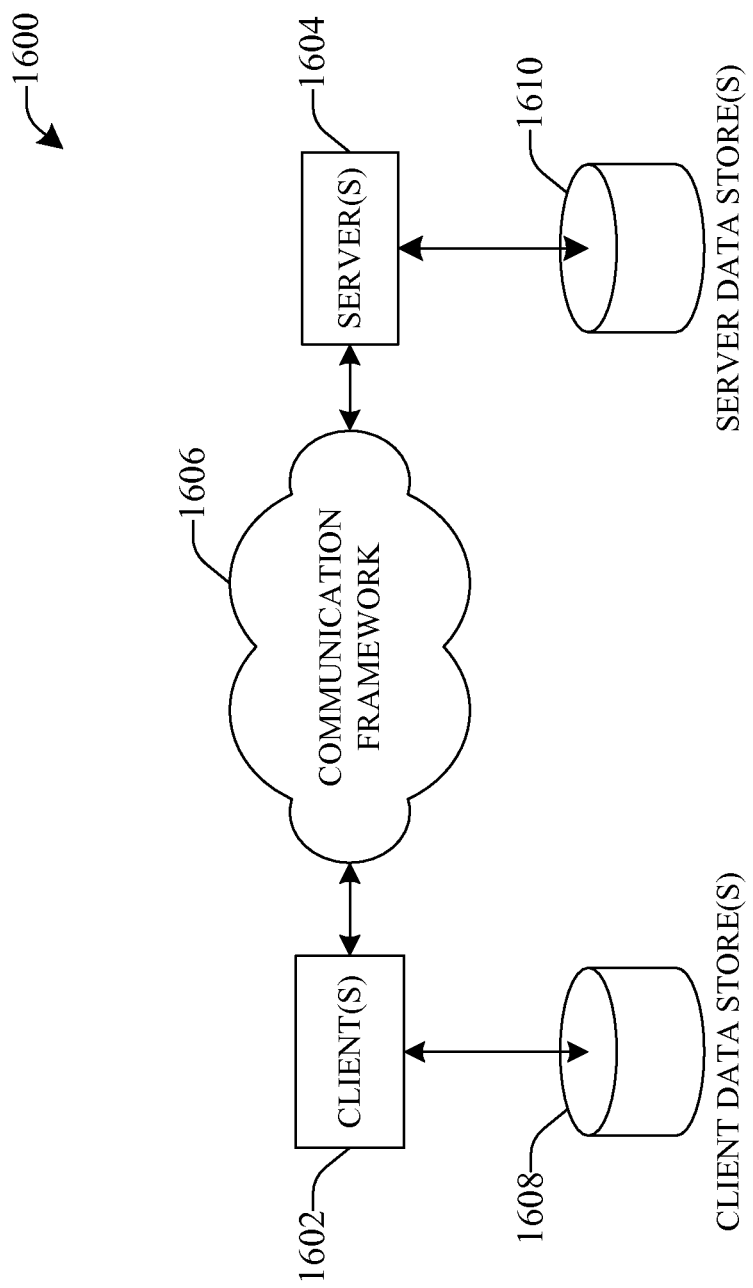
FIGS. 16 and 17 illustrate computing environments for carrying out various aspects described herein.

FIGS. 6A and 6B illustrate, respectively, game solution in-house deployment and outside-service deployment. In-house deployment.—Service platform 610 has control of game platform 110 and information store 120. The service platform can focus on online services operations, e.g., distribution and allocation of content (news, music, on-line content such as blogs, etc.), email service, translation services, blog and webpage hosting services. Players $140_1$-$140_N$ access the service platform over a network, illustrated by communication framework 130 (discussed below; FIGS. 16 and 17). As the game platform 110 is deployed within service platform 610, game solutions address the operational needs of the service platform 610. Game platform 110 acts as a facilitator of solutions to those needs, and service platform 610 can improve its business as a result. In one aspect, the game platform 110 benefits from player intelligence accumulated in the service platform 610, as many of the players $140_1$-$140_N$ are users of the service platform 610. Task components (e.g., component 210) and content components (e.g., component 215) can reside in service platform 610 instead of within the game platform component 110, as in the embodiment discussed in FIG. 2. In an aspect, service platform 610 can design new services for its users and conduct a "hot or not" task regarding such specific service, where players are a selected group of service provider users. The game platform 110 can collect and analyze player response to such task, and from the assessment a recommendation can be delivered to service platform 610 regarding the commercial viability (e.g., commerciality) of the new proposed service.

In another aspect, service platform 610 such as a music records company can employ cooperative games that build content to develop song lyrics in specific music genres (e.g., blues, rock and roll, country). For such a service platform 610, the players $140_1$-$140_N$ can be song-writers affiliated with the records company or prospective song-writers. Those players belong to a group of prototypical players (as discussed above), whose judgment can range from "expert" to "advanced" in a specific domain (e.g., music genre). In an embodiment of such a game, a set of N (N>2) players (e.g., $140_1$-$140_N$) would submit a verse for the lyrics of a song, each player is displayed other players' verses, and selects a verse to be withdrawn. The verse or verses that receive the largest numbers of withdrawal votes are removed from the prospective lyrics. At the discretion of the game platform, the player(s) that submitted the voted off verse(s) can be removed from the game or can continue playing until exhausting a threshold number of allowed voted-off verses and then be removed. After a number of cycles of submission and voting, the lyrics of a song can start developing. In addition, it should be appreciated that the difficulty in selecting a verse to be voted off can increase as the game progresses because the lyrics can become better defined. It should be appreciated that as a community effort, the end result (e.g., song lyrics) need not be attained by a starting set of players (e.g., players $140_1$-$140_N$). Multiple sets of N players can play during multiple game instances—the game is asynchronous—in order to achieve satisfactory final results.

In yet another aspect, a service platform 610 such as a school district can acquire short-term, long-term or permanent rights to a game platform 110 in order to address the problem of defining what on-line content should be deemed inappropriate for delivering it to a specific group of students. Players $140_1$-$140_N$ are the parents and teachers of students. The in-house deployment game solution can leverage off the diversity of players. Such diversity can be exploited further by collecting player intelligence (which can be stored in, e.g., player intelligence store 235). Such intelligence can be collected via a registration process to participate to play the game. Diversity, coupled with a specific game solution (e.g., "hot or not" task), can naturally result in more progressive schools having different norms for what is considered inappropriate than more conservative schools. It should be appreciated that in either school case a "consensus censorship" (e.g., banning agreed inappropriate material) can be reached, which can lead to greater levels of parent satisfaction with the content their children are exposed to, and less incidents with students being exposed to content not approved by parents and teachers.

Outside-Service Deployment.—

Game platform 610 provides game solutions to a plurality of third-party service providers 660, 670, and 680. Game solutions can address specific operational needs of the third-party service platforms 660, 670, and 680. Similarly to the case of in-house deployment, each service platform can focus on online services operations, e.g., distribution and allocation of content (news, music, on-line content such as blogs, etc.), email service, translation services, blog and webpage hosting services. Players $140_1$-$140_N$ can access the service platform over a network, illustrated by communication framework 130 (discussed below; FIG. 17). Relevant information (stored in information store 120) gathered by a game platform, such as image ranking; URL ranking; catalog; etc., can be sold to third-party service platforms 660, 670, 680. It should be appreciated that in this outside-service deployment, both online and offline businesses can benefit from a customized game solution. In addition, games can be customized for specific customers, where the customers (management teach, technical staff, administrative staff) can themselves be players. It should be appreciated that as game solutions are contained in the game platform 110, games offered for an operational need in in-house deployment are the same as those solutions offered to an organization associated with the game platform 110 through the outside-service deployment.

Design principles and implementation aspects described supra are illustrated in FIGS. 7-10 with an actual on-line image selection game (ISG). The task of the game is to select an image out of a plurality of images that best matches a query or keyword. Such a task allows the game platform 110 that controls the game to label, rank, sort, or any combination thereof, images existent in a content store (e.g., content store 215). The information collected as a result of players $140_1$-$140_N$ participating in the game can be used to identify obvious, clear best images, as well as images amidst a set of nearly-equally satisfactory images. ISG can also be used to flag inappropriate content, a significant problem in image searches.

The image selection game is based on discrete choices, and a game facilitation component 220 randomly forms partnerships of pairs of players out of the plurality of players $140_1$-$140_N$. Players are displayed query/keyword simultaneously with a (same) set of images. No communication is allowed among players. Points are awarded equally to both players in a playing pair upon agreement on the selection of an image as best representing a query or keyword. Upon agreeing on an image, the number of images displayed to players in a subsequent play is increased by one; disagreement leads to a reduction of one in the number of figures displayed in a subsequent play. Additionally, agreement results in establishing an association between the selected image and the query. Such association is the relevant information that can be extracted by game platform 110 and stored in an information store 120. It is noted that AI component 248 can employ the stored association information in an active-learning sense: Based on previous image-query associations, AI component 248 can decide in a game play what association to implement between a displayed image and a query. Points are awarded in proportion to the number of images displayed. Upon a successful play, a larger set of images is rendered to each player, in order to increase game complexity and challenge. Concomitantly, agreement with a larger number of images provides a higher fidelity in the association between image and query/keyword. It is noted that the images in the set are presented in permuted order to reduce positional bias (see discussion above). In ISG, scores have monetary value within the game platform 110 (not shown) that controls the game. Players can claim rewards based on the level of points accumulated during a number of games. Each ISG match is synchronous and spans 90 seconds. It should be appreciated that, as discussed above, this choice is predetermined by the game platform 110 that controls the game. Next, selected screenshots of ISG are discussed.

Figure 7:
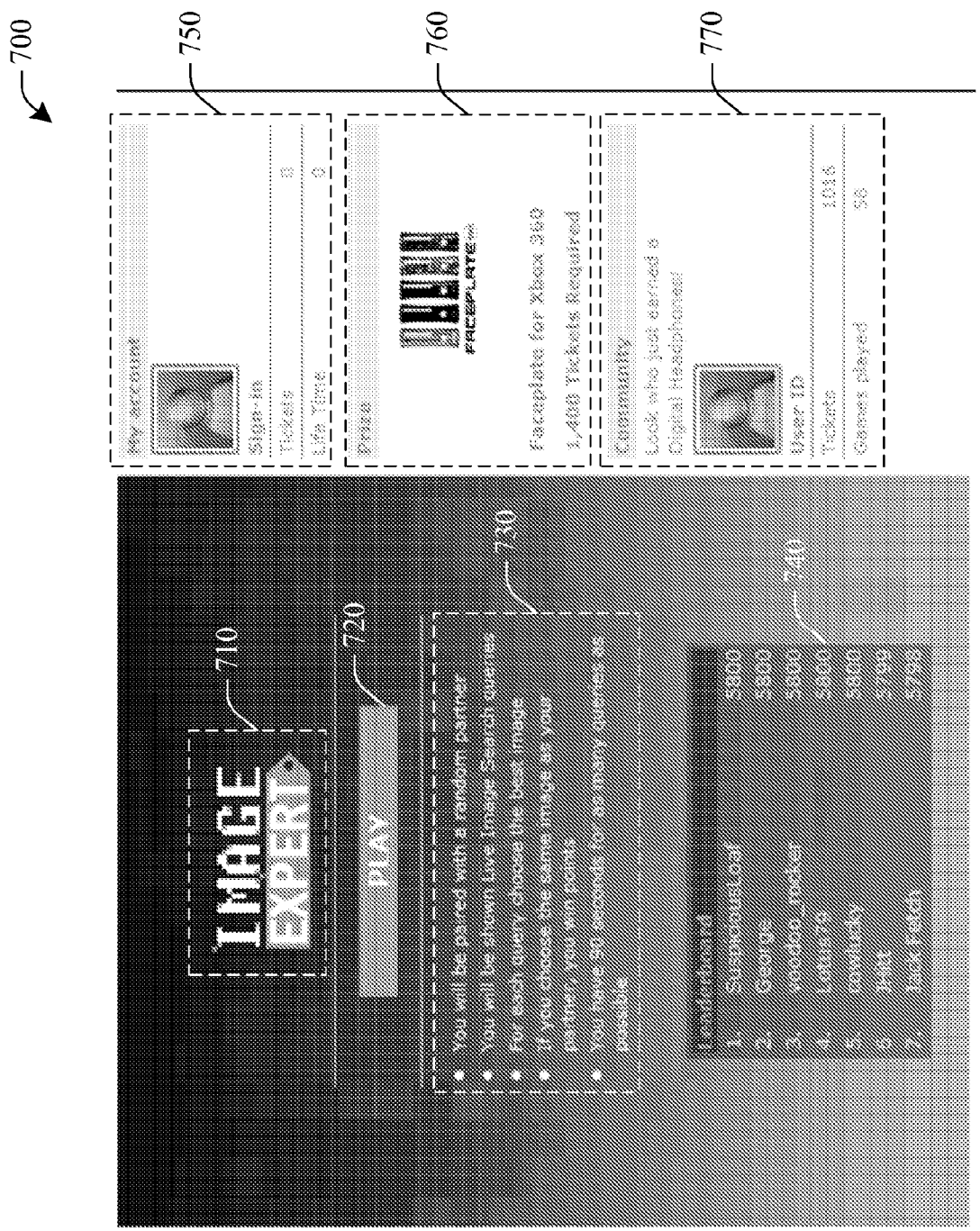
FIG. 7 is a screenshot of an actual image selection game.

FIG. 7 illustrates the landing page 700 of ISG. The title 710 of the ISG implementation is displayed in addition to a "play" action key 710, a how-to-play instruction set 730, and historical scores 740 ("leaderboard") of top m scoring players (m=7 in FIG. 7). In an aspect, such historical scores can be retrieved from scores store 232. Landing page 700 also shows information 750 on the player ("My account"), information 760 on available rewards ("Prize") offered by the game platform (or a service platform in case the game solution is deployed according to in-house deployment considerations); and information 770 on other members of the ISG community ("Community"), with historical data on games played and points (e.g., tickets) earned.

Figure 8:
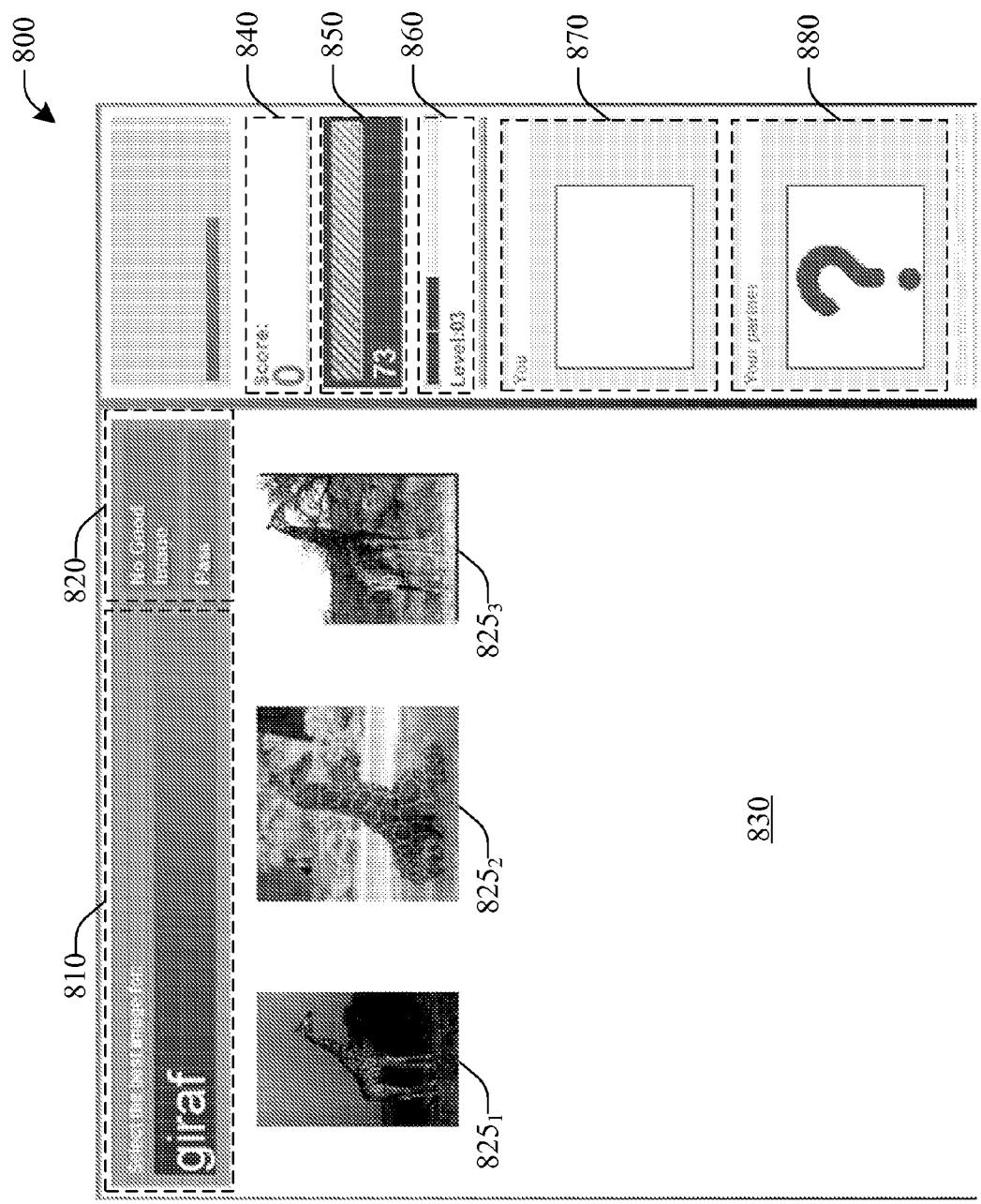
FIG. 8 is a screenshot of an actual player graphical interface of an image selection game.

FIG. 8 illustrates an actual player graphical interface 800 in a round of ISG. A task indicator 810 shows succinctly the task related to ISG. In realization 800, the task indicator reads "Select the best image for: giraf." It should be appreciated that the query/keyword "giraf" does not conform to spelling rules of the English language; however, from human contextual inference the query/keyword can be quickly associated with the English word "giraffe." Such inference simplifies the association process between the original query/keyword and the images presented to the players. It should be appreciated that such contextual inference would likely result in computerized or artificial intelligence agents to fail the query-image association. In case images cannot be associated with the query/keyword, players have the option to select special images "No good image" and "Pass" in sub-panel 820. As an example, selection of "No good image" can be motivated by a clear mismatch between the query/keyword and the displayed images: Query is "flower" but all images rendered are images of boats. Players do not score points for choosing such special images.

Scoring and timing information (e.g., elapsed time, remaining time) are displayed, respectively, in areas 840 and 850. Images are displayed to players in a display area 830. The number of rendered images (e.g., $825_1$-$825_3$) depends on the level of complexity of the current round, which is indicated in 860. Once a player makes a selection, such selection is displayed in player input areas 860 and 870. One of these areas is for a first player's selection, and the other is for a second player's selection.

Figure 9:
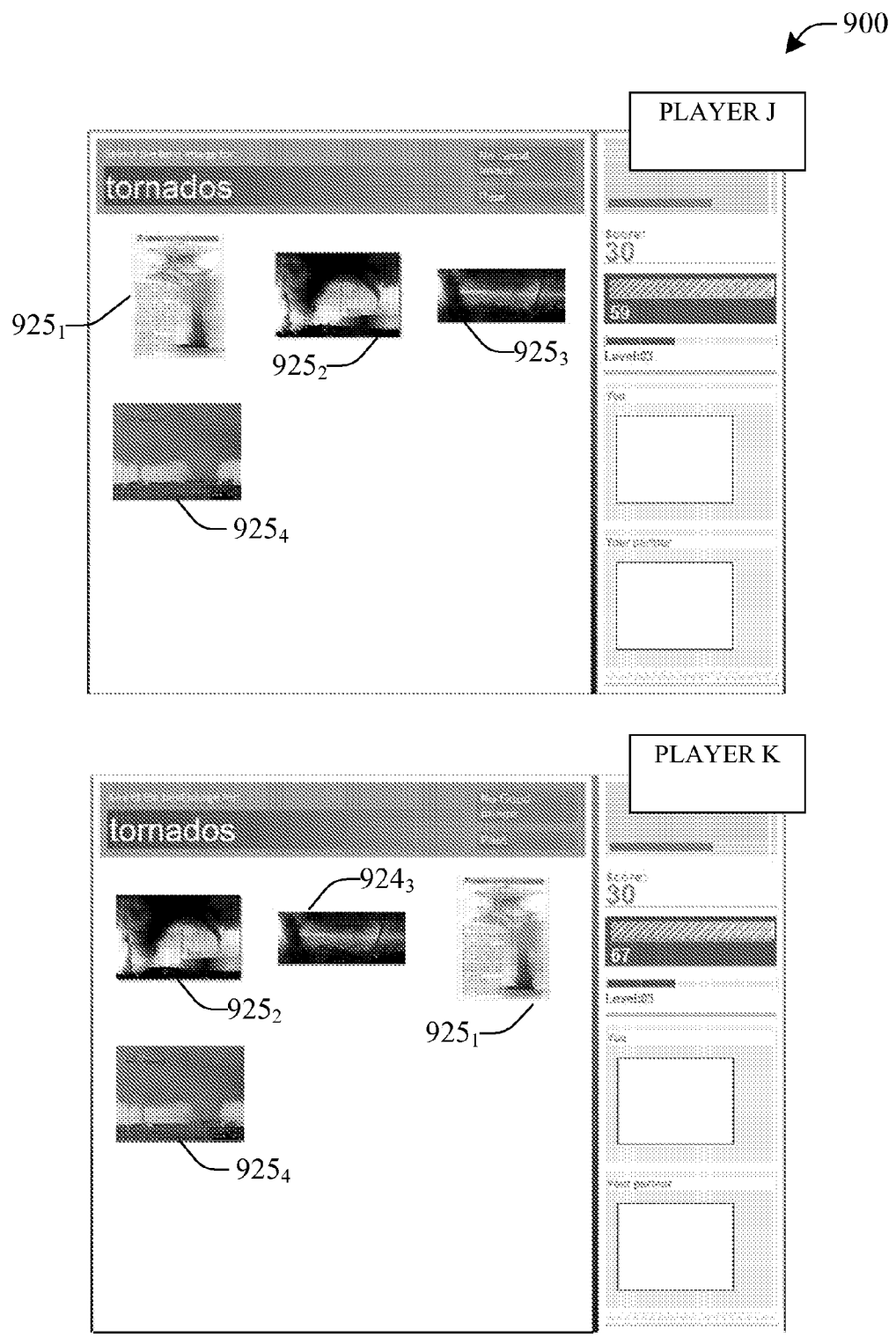
FIG. 9 is a screenshot of actual player interfaces for two players in a round of an image selection game.

FIG. 9 illustrates actual player interfaces 900 for two players (player J and player K) in a round of ISG. For the selected query ("tornados"), players J and K are displayed the same set of images ($925_1$-$925_4$) but in permuted order. The permutation mitigates choice bias due to positional bias (see above), and thus ensures that the choice is driven by image content and context and not by spatial arrangement. It should be appreciated that any permutation (e.g., cyclic or pseudorandom) can be employed to "shuffle" the displayed images.

Figure 10:
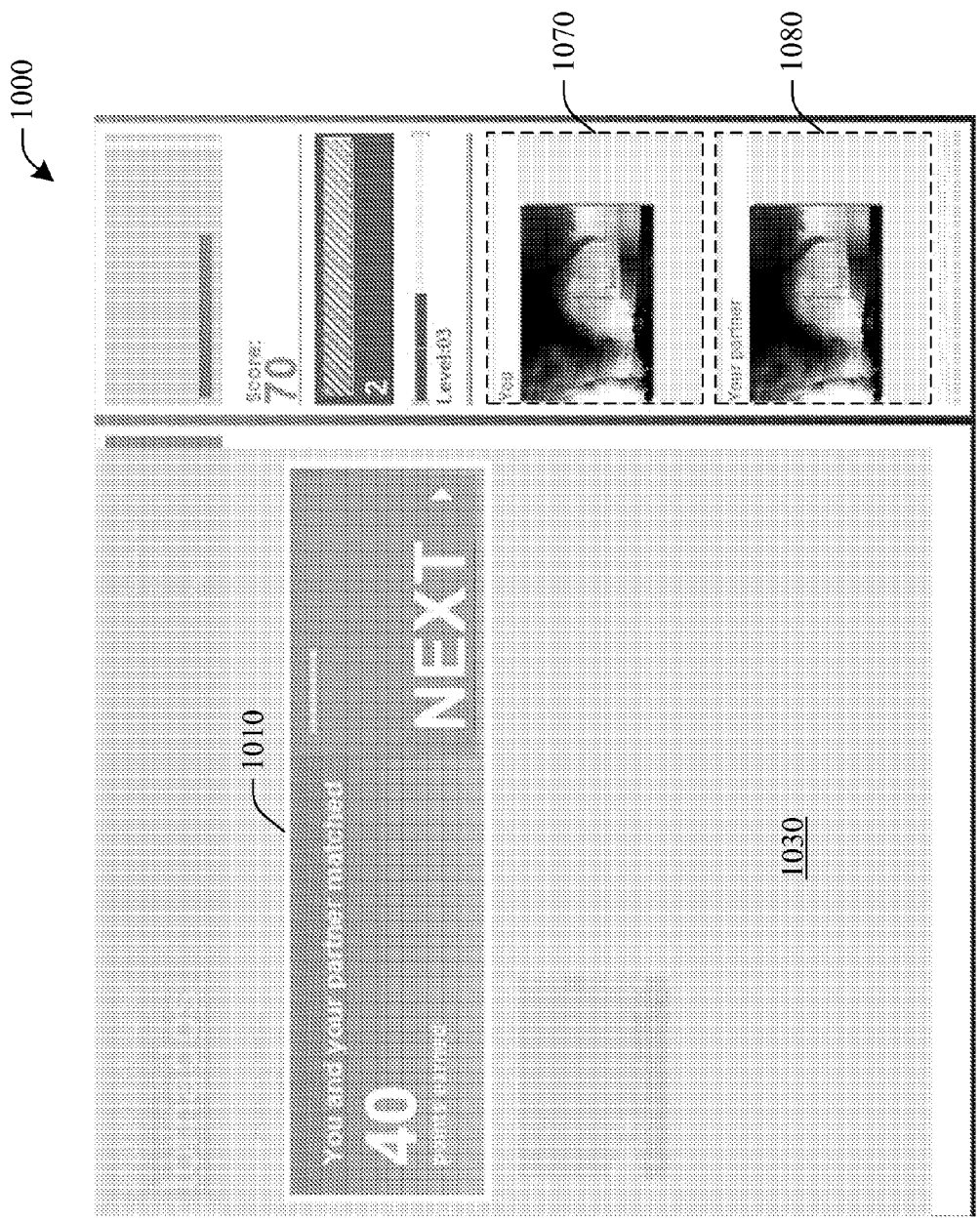
FIG. 10 is a screenshot of an actual player interface when players have selected the same image in an on-line image selection game.

FIG. 10 illustrates an actual player interface 1000 in a round of ISG where players have selected the same image. In such instance, the selected images are shown in display areas 1070 and 1080, and an information update banner 1010 is displayed in area 1030. The banner informs that both players have agreed in their image selection ("You and your partner matched"), and conveys the points awarded to each player ("40 points earned"). It should be appreciated that information update banners are displayed in other instances of ISG, e.g., when a player has made an image selection and waits for a partner player to make a selection. An exemplary message in such instance is "Waiting for your partner to select . . . ."

Image selection game is a synchronous game with a finite time allotted to play. When such allotted times elapses, the finished-match player interface (not shown) indicates with an information banner that time has elapsed, presents a summary of points earned during the match, and displays choices of (1) continuing to play with a new randomly chosen partner, or (2) quit.

FIGS. 11-15 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers.

Figure 11:
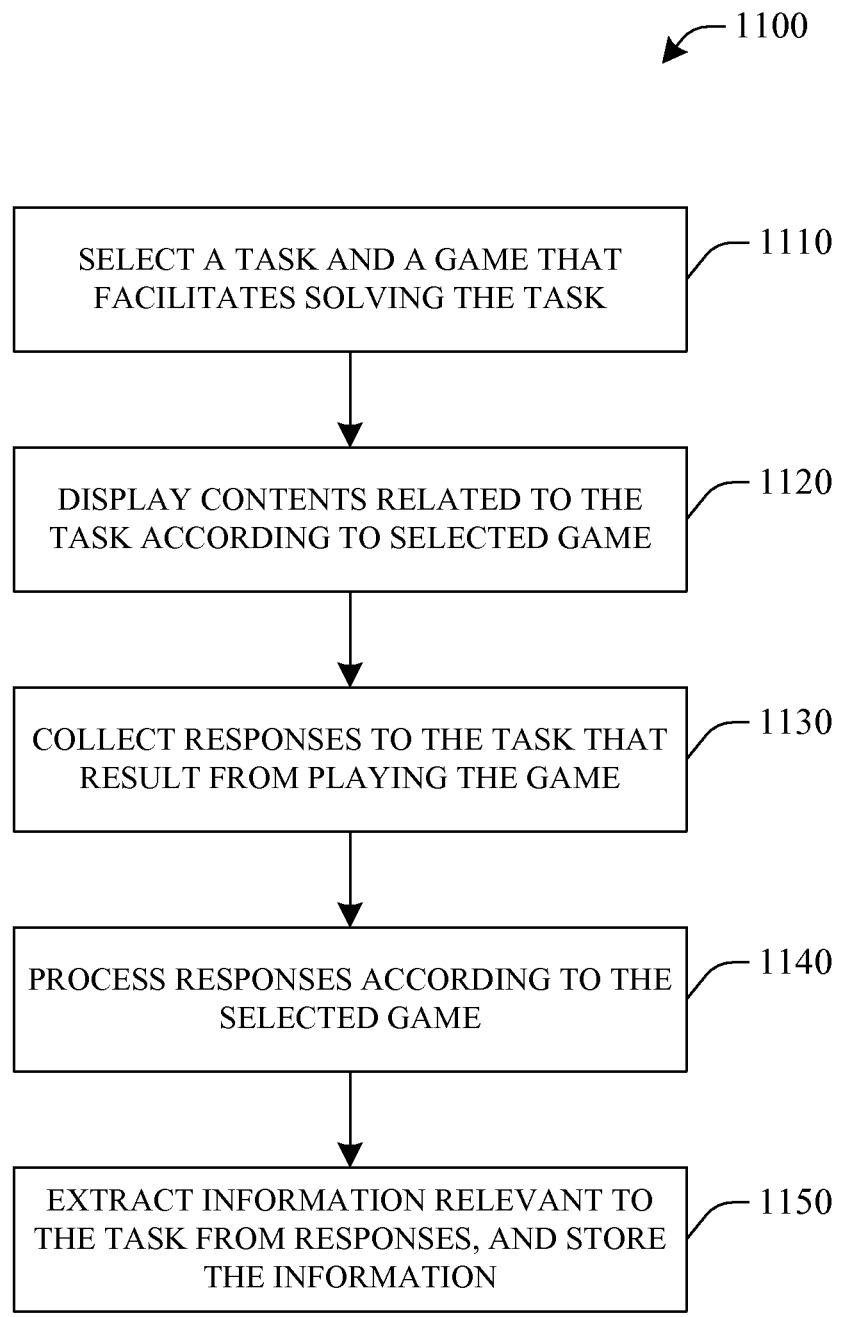
FIG. 11 is a flowchart of a computer-implemented method to extract relevant information through gaming.

FIG. 11 presents a computer-implemented method 1100 to extract relevant information related to a task or specific need via a collaborative game. At 1110, a task and a collaborative game that facilitates solving the task are selected. In an aspect, the task reflects a specific need of a service platform (see, e.g., FIGS. 6A and 6B). Such need can be, for example, image labeling, sorting, and ranking for image search; music and video labeling for image searches; evaluation of blogs' tone, relevance, and reputation; determination of web and email content that can be construed as spam; machine translation games; etc. At 1120, contents related to the task are displayed according to the specific rules of the game designed to address the task. As an example, displayed content items can consist of images, fragments of text, video, music, or a combination thereof. At 1130 and 1140, responses to the task that are obtained through playing the game are collected and processed. The processing is done according to the rules of the selected game. In an aspect, in a game of associating an image with a query (e.g., ISG discussed above), players select an image that best describes a query, the collected information correspond to the image selected by players, and the processing consists of determining whether two or more players selected the same image in response to the query. In another aspect, in a game of ranking URLs for searches, the collection of information consists of gathering a plurality of rankings as established by two or more players, while processing corresponds to determining whether there are matching rankings or not. At 1150, information relevant to the task is extracted from the responses to the game, and the information is stored. The particular type of information that is gathered depends on the selected game, as the information is retrieved from responses to such game.

Figure 12:
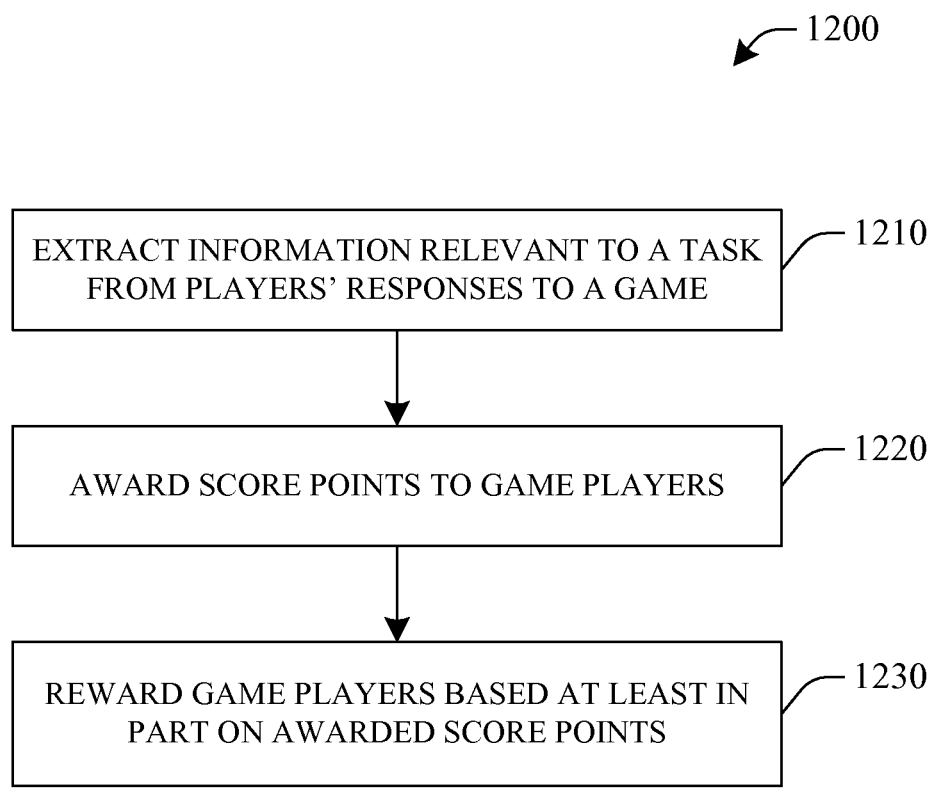
FIG. 12 is a flowchart of a computer-implemented method to reward players of a game.

FIG. 12 is a flowchart of a computer-implemented method 1200 to reward players of a game. At 1210, information relevant to a task is extracted from responses to game(s) designed specifically to address such task. At 1220, game players accrue score points as they play game(s). Players' responses throughout a game match results in different levels of score points. In an aspect, games that require matching responses from multiple players can contemplate increasingly higher scoring points assigned to player(s) for sequences of matches, rather than assigning a fixed number of points per each match. In another aspect, player(s) can lose previously accrued points each time a non-match takes place. In a complex game, such scoring approach tends to remove players with disparate levels of expertise as the game progresses, leading to a pool of players with similar judgment level (e.g., expert level or advanced level). Players are rewarded at 1230. The rewards are based at least in part on accrued points. Players can be rewarded (i) directly, by receiving goods or merchandise, or discounts on selected products, in exchange of currency points, which have monetary value and represent a fraction of the points accrued during game(s), or (ii) indirectly where points are used to meet eligibility requirements to enter a lottery of prizes or monetary instruments.

Figure 13:
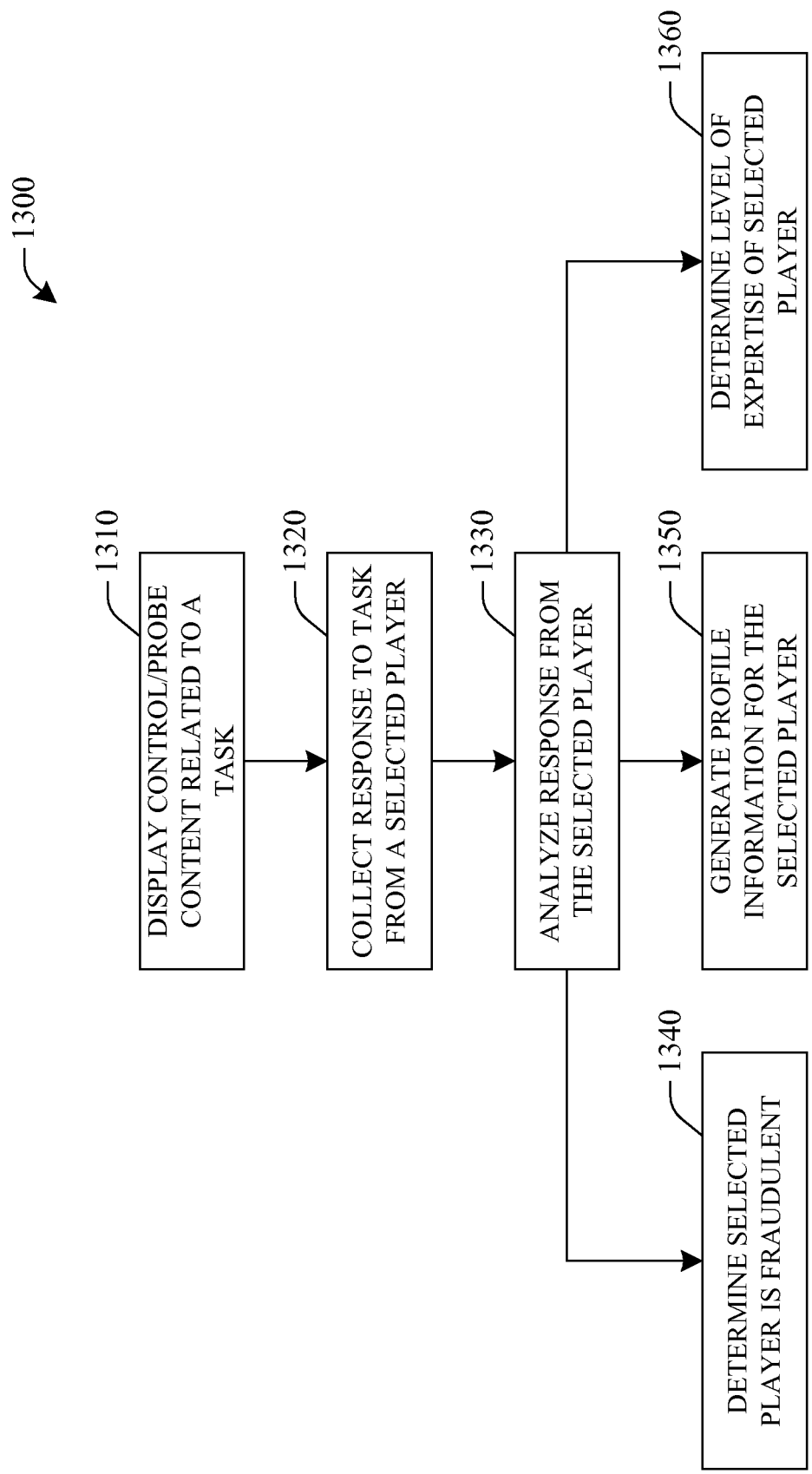
FIG. 13 is a flowchart of a computer-implemented method to determine characteristics of a game player.

FIG. 13 presents a computer-implemented method to determine characteristics of a player. Characteristics include (a) whether the player is fraudulent or not. It should be appreciated that in reward-based games fraud is likely to occur because scoring points have monetary value. (b) A profile of the player. In an aspect, such profile can be psychological makeup (e.g., personality traits) of a player. In another aspect, player's soft skills or "people talents" are profiled. (c) Player level of expertise in a specific field. At 1310, control or probing content related to a task is presented to a selected player. At acts 1320 and 1330, response(s) from the selected player to the control/probing contents are collected and analyzed. Acts 1340, 1350, and 1360 are conclusive acts derived from response(s) to the control content: At 1340 it is determined whether the player is fraudulent, such as a robot seeking indiscriminate point accumulation; at 1350 a profile of the player is generated; and at 1350 the level of expertise of the selected player is determined.

Figure 14:
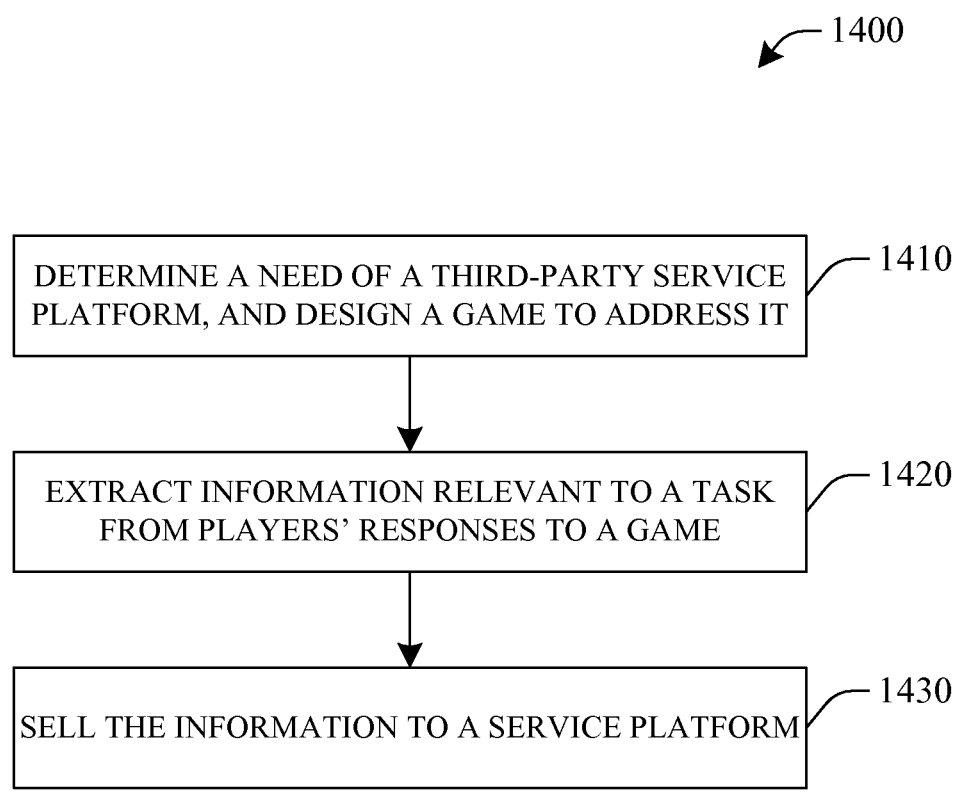
FIG. 14 is a flowchart of a computer-implemented method to benefit from specific needs of a third-party.

FIG. 14 is a computer-implemented method to benefit from specific needs of a third-party platform. At 1410, a specific need of a third-party service platform is determined and a game is designed to address it. In an aspect, a service platform can be a civil-rights advocacy group in need of rising awareness of offensive, racially-charged on-line blogs, or the like. In such aspect, a game is designed to analyze the tone of on-line blogs, or similar webpages. In another aspect, a service platform can be a book publisher in need of compelling poetry authors; a suitably designed game can pursue a "hot or not" task to determine compelling authors from a list of possible authors. In yet another aspect, a service platform can be a small business seeking to filter email spam. A game to develop a spam-filtering objective function can be designed based on evaluating a test set of email messages received by the email server of the small business, and determining whether those messages are spam. At 1420, information relevant to a task reflecting the need of third party is extracted from player responses to the custom-designed game. At 1430, the information is sold to third-party service platform.

Figure 15:
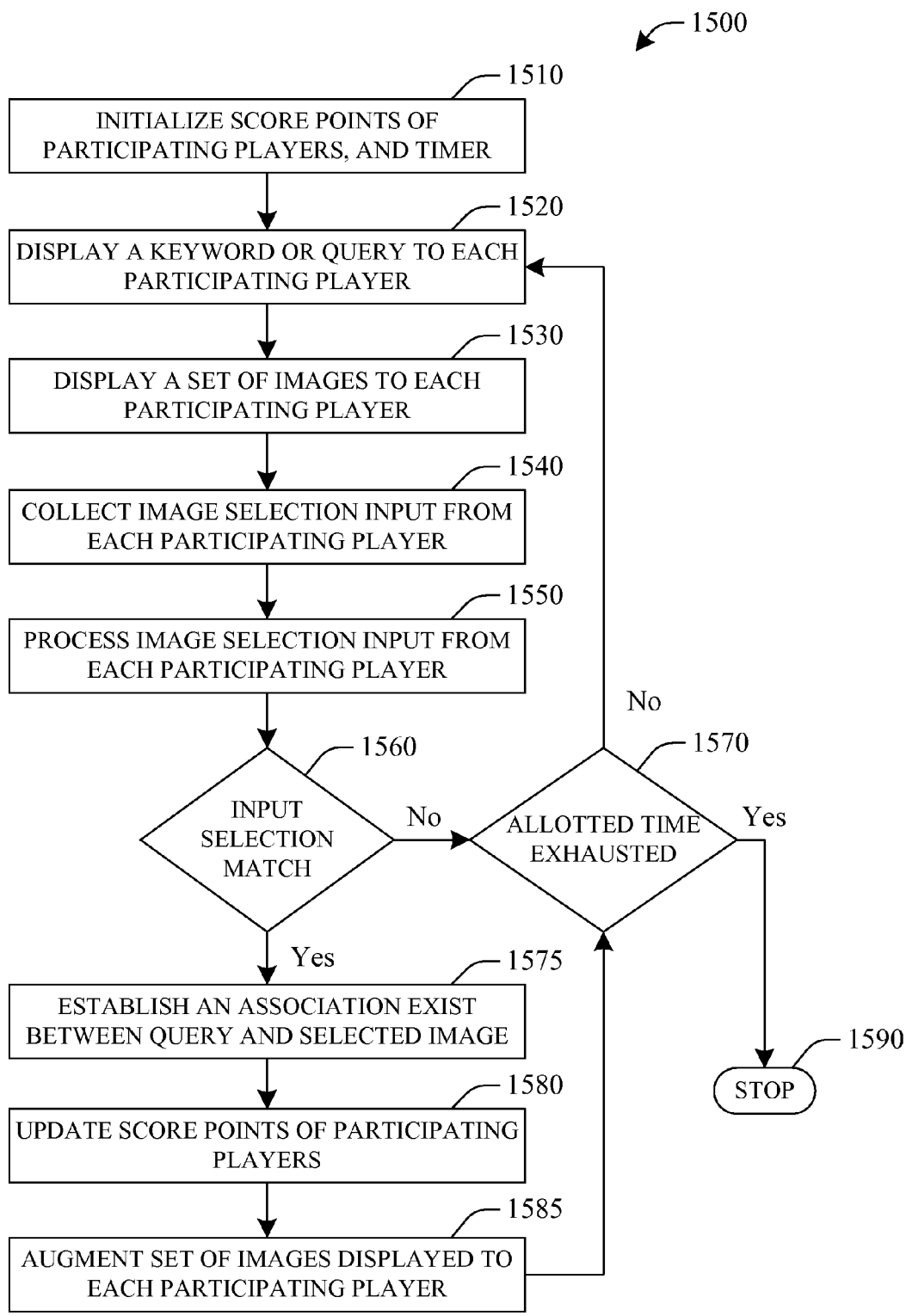
FIG. 15 is a flowchart of a computer-implemented method for an image selection game.

FIG. 15 presents a computer-implemented method for an image selection game. The game is assumed to be synchronous, and played by a pair of randomly chosen partners. It should be appreciated, however, that partners can be chosen using other metrics such as profile-based selection (profiles can be obtained, e.g., employing method 1300 above, or retrieved from player intelligence store 235), or selection based on records/transcripts of previously played games (such records/transcripts can be stored, e.g., in game logs store 245). In addition, the number of playing partners can be larger than two. At 1510, score and time monitors are initialized. At 1520 and 1530 a query/keyword and set of images are displayed, respectively, to each participating player. In an aspect, queries/keywords and images are drawn from content store 215, where a query log can be stored by a game platform 110. At 1540, image selection input (e.g., player response) is collected from each participating player, and at 1550 such input is processed. Acts 1560 and 1570 are validation acts: At 1560, agreement or a match between image selection inputs is checked. In the positive case, at act 1575 an association is established to exist between the query and the image that has been selected by more than one player, then scores of participant players is updated (e.g., by scoring component 230) in act 1580 and the game flow is directed to act 1585, where the set of images displayed to participating players is augmented, and subsequently the game flow is directed to 1570. In the negative case the flow is directed to act 1570. Act 1570, checks whether the allotted time for the game is exhausted. A positive check results in the game flow stopping at 1590; a negative check directs the flow of the game to act 1520.

FIG. 16 illustrates a schematic block diagram of a computing environment 1600 in accordance with the subject specification. The system 1600 includes one or more client(s) 1602. The client(s) 1602 can be hardware and/or software (e.g., threads, processes, computing devices). The client(s) 1602 can house cookie(s) and/or associated contextual information by employing the specification, for example.

The system 1600 also includes one or more server(s) 1604. The server(s) 1604 can also be hardware and/or software (e.g., threads, processes, computing devices). The servers 1604 can house threads to perform transformations by employing the specification, for example. One possible communication between a client 1602 and a server 1604 can be in the form of a data packet adapted to be transmitted between two or more computer processes. The data packet may include a cookie and/or associated contextual information, for example. The system 1600 includes a communication framework 1606 (e.g., a global communication network such as the Internet) that can be employed to facilitate communications between the client(s) 1602 and the server(s) 1604.

Communications can be facilitated via a wired (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604.

FIG. 17 illustrates a block diagram of a computer operable to execute the disclosed architecture. In order to provide additional context for various aspects of the subject specification, FIG. 17 and the following discussion are intended to provide a brief, general description of a suitable computing environment 1700 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

In FIG. 17, the exemplary environment 1700 for implementing various aspects of the specification includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi-processor architectures may also be employed as the processing unit 1704.

The system bus 1708 can be any of several types of bus structure that may further interconnect to a memory bus (with or without a memory controller), a peripheral bus, and a local bus using any of a variety of commercially available bus architectures. The system memory 1706 includes read-only memory (ROM) 1710 and random access memory (RAM) 1712. A basic input/output system (BIOS) is stored in a nonvolatile memory 1710 such as ROM, EPROM, EEPROM, which BIOS contains the basic routines that help to transfer information between elements within the computer 1702, such as during start-up. The RAM 1712 can also include a high-speed RAM such as static RAM for caching data.

The computer 1702 further includes an internal hard disk drive (HDD) 1714 (e.g., EIDE, SATA), which internal hard disk drive 1714 may also be configured for external use in a suitable chassis (not shown), a magnetic floppy disk drive (FDD) 1716, (e.g., to read from or write to a removable diskette 1718) and an optical disk drive 1720, (e.g., reading a CD-ROM disk 1722 or, to read from or write to other high capacity optical media such as the DVD). The hard disk drive 1714, magnetic disk drive 1716 and optical disk drive 1720 can be connected to the system bus 1708 by a hard disk drive interface 1724, a magnetic disk drive interface 1726 and an optical drive interface 1728, respectively. The interface 1724 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. It is appreciated that the specification can be implemented with various commercially available operating systems or combinations of operating systems.

A user can enter commands and information into the computer 1702 through one or more wired/wireless input devices, e.g., a keyboard 1738 and a pointing device, such as a mouse 1740. Other input devices (not shown) may include a microphone, an IR remote control, a joystick, a game pad, a stylus pen, touch screen, or the like. These and other input devices are often connected to the processing unit 1704 through an input device interface 1742 that is coupled to the system bus 1708, but can be connected by other interfaces, such as a parallel port, an IEEE 1794 serial port, a game port, a USB port, an IR interface, etc.

A monitor 1744 or other type of display device is also connected to the system bus 1708 via an interface, such as a video adapter 1746. In addition to the monitor 1744, a computer typically includes other peripheral output devices (not shown), such as speakers, printers, etc.

The computer 1702 may operate in a networked environment using logical connections via wired and/or wireless communications to one or more remote computers, such as a remote computer(s) 1748. The remote computer(s) 1748 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1750 is illustrated. The logical connections depicted include wired/wireless connectivity to a local area network (LAN) 1752 and/or larger networks, e.g., a wide area network (WAN) 1754. Such LAN and WAN networking environments are commonplace in offices and companies, and facilitate enterprise-wide computer networks, such as intranets, all of which may connect to a global communications network, e.g., the Internet.

When used in a LAN networking environment, the computer 1702 is connected to the local network 1752 through a wired and/or wireless communication network interface or adapter 1756. The adapter 1756 may facilitate wired or wireless communication to the LAN 1752, which may also include a wireless access point disposed thereon for communicating with the wireless adapter 1756.

When used in a WAN networking environment, the computer 1702 can include a modem 1758, or is connected to a communications server on the WAN 1754, or has other means for establishing communications over the WAN 1754, such as by way of the Internet. The modem 1758, which can be internal or external and a wired or wireless device, is connected to the system bus 1708 via the serial port interface 1742. In a networked environment, program modules depicted relative to the computer 1702, or portions thereof, can be stored in the remote memory/storage device 1750. It will be appreciated that the network connections shown are example and other means of establishing a communications link between the computers can be used.

The computer 1702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   one or more processors;
   memory coupled to the one or more processors;
   a task component stored in the memory and executable by the one or more processors to define an objective to be accomplished and information to be collected during a game play of a collaborative game;
   a profiling component stored in the memory and executable by the one or more processors to build profiles of multiple players based at least in part on behavior of the multiple players in past collaborative games, and to store the profiles of the multiple players in a player intelligence store, the profiles of the multiple players characterizing the multiple players and respective expertise in one or more specific fields;
   an artificial intelligence component stored in the memory and executable by the one or more processors to construct similarity measures using the profiles of the multiple players stored in the player intelligence store, and to apply a hierarchical and density based clustering algorithm to identify a plurality of players for playing the collaborative game based at least in part on values of the similarity measures;
   a display component stored in the memory and executable by the one or more processors to cause a display of information of at least one player of the plurality of players in response to receiving a consent from the at least one player, wherein the information of the at least one player comprises an endorsement of the collaborative game to add a social aspect to the collaborative game and additional information that engages at least one other player of the plurality of players to join the collaborative game; and
   a scoring component stored in the memory and executable by the one or more processors to award a first number of score points to a first player of the plurality of players upon completion of a task related to the objective.

2. The system of claim 1, further comprising a storage component to store the information collected during the game play.

3. The system of claim 1, further comprising a fraud component that mitigates fraud aimed at indiscriminately increasing awarded score points, and manipulating the information collected during the game play of the collaborative game in anticipation of a use of the information.

4. The system of claim 1, wherein the objective includes associating an image with a query, ranking a plurality of images, or sorting a plurality of images.

5. The system of claim 1, wherein the objective includes ranking a universal resource locator (URL) for an on-line based search, assessing relevance of an on-line search result, or assessing relevance of a snippet content to summarize an on-line search result.

6. The system of claim 1, wherein the objective includes translation of natural language documents from a first language to a second language, or transcription of handwritten content, telephone conversations, or music or song lyrics.

7. The system of claim 1, wherein the objective includes identifying webpage spam or email message spam.

8. The system of claim 1, wherein the objective includes assessing a blog reputation, relevance, and tone.

9. The system of claim 1, further comprising a content store that stores content relevant to accomplishing the objective, the content includes an image, an email message, a blog fragment, a query log, a universal resource locator (URL) listing, a title list and a fragment of movies, songs, and books, both in English and foreign languages, a question listing, a published scientific article, a "fact book" and a profile of a university, college, or high school, a set of occupational data, an entertainment information, a health information, and/or a document in a foreign language.

10. The system of claim 1, further comprising a game store that includes a plurality of games that facilitate accomplishing the objective defined by the task component.

11. A computer-implemented method comprising:
   defining an objective to be accomplished and information to be collected during a game play of a collaborative game;
   building profiles of multiple players based at least in part on behavior of the multiple players in past collaborative games, the profiles of the multiple players characterizing the multiple players and respective expertise in one or more specific fields;
   storing the profiles of the multiple players in a player intelligence store;
   constructing similarity measures using the profiles of the multiple players stored in the player intelligence store;
   applying a hierarchical and density based clustering algorithm to identify a plurality of players for playing the collaborative game based at least in part on values of the similarity measures;
   causing a display of information of at least one player of the plurality of players in response to receiving consent from the at least one player, the information of the at least one player comprising an endorsement of the collaborative game to add a social aspect to the collaborative game and additional information that engages at least one other player of the plurality of players to join the collaborative game; and awarding a first number of score points to a first player of the plurality of players upon completion of a task related to the objective.

12. The method of claim 11, wherein the task is relevant to a third-party entity, and the method further comprises extracting information relevant to the task by playing the collaborative game, and selling the information to the third-party entity.

13. The method of claim 11, further comprising penalizing a second player of the plurality of players in response to determining that the second player communicates with another player of the plurality of players to dissuade the second player from using communication to commit a fraud.

14. The method of claim 11, further comprising determining whether a second player of the plurality of players is a legitimate player by monitoring a response time of the second player.

15. The method of claim 11, further comprising using responses of the plurality of players to develop test data for training and learning of an artificial intelligence agent that is used in solving the task of the collaborative game.

16. The method of claim 11, further comprising penalizing a second player of the plurality of players in response to determining that the second player communicates with one or more other players during the game play of the collaborative game, the penalizing comprising deducting score points from the second player based at least on a number of communications of the second player with the one or more other players.

17. A computing device comprising:

one or more processors;

memory coupled to the one or more processors;

a profiling component stored in the memory and executable by the one or more processors to build profiles of multiple players of a collaborative game based at least in part on behavior of the multiple players in past collaborative games, and to store the profiles of the multiple players in a player intelligence store, the profiles of the multiple players characterizing the multiple players and respective expertise in one or more specific fields;

an artificial intelligence component stored in the memory and executable by the one or more processors to construct similarity measures using profiles of multiple players stored in a player intelligence store, and apply a hierarchical and density based clustering algorithm to identify a plurality of players for playing the collaborative game based at least in part on values of the similarity measures;

a display component stored in the memory and executable by the one or more processors to cause a display of information of at least one player of the plurality of players, the information of the at least one player comprising an endorsement of the collaborative game to add a social aspect to the collaborative game and additional information that engages at least one other player of the plurality of players to join the collaborative game; and a game facilitation component stored in the memory and executable by the one or more processors to execute the collaborative game for the at least one other player of the plurality of players.

18. The computing device of claim 17, further comprising:

a task component stored in the memory and executable by the one or more processors to define an objective to be accomplished and information to be collected during a game play of the collaborative game; and a scoring component stored in the memory and executable by the one or more processors to:

award a first number of score points to a first player of the plurality of players upon completion of a task related to the objective; and/or penalize a player of the plurality of players in response to determining that the player communicates with one or more other players of the plurality of players during the game play of the collaborative game, the penalizing comprising deducting score points from the player based at least on a number of communications of the player with the one or more other players.

19. The computing device of claim 18, further comprising a fraud component to mitigate fraud aimed at indiscriminately increasing awarded score points, and to manipulate the information collected during the game play of the collaborative game in anticipation of a use of the information.

20. The computing device of claim 18, wherein the objective includes associating an image with a query, ranking a plurality of images, sorting a plurality of images, ranking a universal resource locator (URL) for an on-line based search, assessing relevance of an on-line search result, assessing relevance of a snippet content to summarize an on-line search result, translation of natural language documents from a first language to a second language, transcription of handwritten content, telephone conversations, music or song lyrics, identifying webpage spam or email message spam, or assessing a blog reputation, relevance or tone.

* * * * *